United States Patent
Abbott et al.

(10) Patent No.: US 12,169,854 B2
(45) Date of Patent: Dec. 17, 2024

(54) ALIGNING PROVIDER-DEVICE AXES WITH TRANSPORTATION-VEHICLE AXES TO GENERATE DRIVING-EVENT SCORES

(71) Applicant: Lyft, Inc., San Francisco, CA (US)

(72) Inventors: Alya Abbott, San Francisco, CA (US); Devjit Chakravarti, Orinda, CA (US); Alexander Wesley Contryman, San Francisco, CA (US); Michael Jonathan DiCarlo, El Dorado Hills, CA (US); Julien van Hout, San Francisco, CA (US); James Kevin Murphy, San Francisco, CA (US); Renee Hei-Kyung Park, San Francisco, CA (US); Ashivni Shekhawat, Emeryville, CA (US); Zhan Zhang, Mountain View, CA (US)

(73) Assignee: Lyft, Inc., San Francisco, CA (US)

( * ) Notice: Subject to any disclaimer, the term of this patent is extended or adjusted under 35 U.S.C. 154(b) by 849 days.

(21) Appl. No.: 16/820,528

(22) Filed: Mar. 16, 2020

(65) Prior Publication Data

US 2021/0287262 A1    Sep. 16, 2021

(51) Int. Cl.
*G06Q 30/0282*    (2023.01)
*G01C 21/34*    (2006.01)
(Continued)

(52) U.S. Cl.
CPC ..... *G06Q 30/0282* (2013.01); *G01C 21/3484* (2013.01); *G01C 21/367* (2013.01); *G06Q 50/40* (2024.01)

(58) Field of Classification Search
None
See application file for complete search history.

(56) References Cited

U.S. PATENT DOCUMENTS

| | | | |
|---|---|---|---|
| 9,086,948 B1 | 7/2015 | Slusar et al. | |
| 9,465,214 B2 * | 10/2016 | Feldman | B60K 35/50 |

(Continued)

FOREIGN PATENT DOCUMENTS

| | | | | |
|---|---|---|---|---|
| AU | 2018313085 A1 * | 3/2020 | | G01C 21/34 |
| CN | 109547988 A * | 3/2019 | | H04B 5/0037 |

(Continued)

OTHER PUBLICATIONS

B. Wallace, M. Rockwood, R. Goubran, F. Knoefel, S. Marshall and M. Porter, "Measurement of vehicle acceleration in studies of older drivers from GPS position and OBDII velocity sensors," 2015 IEEE International Symposium on Medical Measurements and Applications (MeMeA) Proceedings, Turin, Italy (Year: 2015).*

(Continued)

*Primary Examiner* — Aryan E Weisenfeld
*Assistant Examiner* — Kai Nmn Wang
(74) *Attorney, Agent, or Firm* — Keller Preece PLLC

(57) ABSTRACT

This disclosure describes a vehicle-motion-analysis system that can align axes for a provider device and a corresponding transportation vehicle based on the provider device's location and motion data as a basis for generating driving-event scores for particular driving events. In particular, the disclosed systems can generate axes-rotation parameters that align axes of a provider device with axes of a transportation vehicle. In addition, the disclosed systems can identify motion paths, motion patterns, or other driving behaviors that occur during particular driving events. Further, the disclosed systems can generate driving-event scores for such driving events and can customize a graphical user interface based on the driving-event scores to reflect a provider rating and/or a location rating.

20 Claims, 17 Drawing Sheets

(51) Int. Cl.
*G01C 21/36* (2006.01)
*G06Q 50/40* (2024.01)

(56) References Cited

U.S. PATENT DOCUMENTS

| | | | |
|---|---|---|---|
| 9,654,932 | B1 | 5/2017 | Mukhtar et al. |
| 9,691,115 | B2 | 6/2017 | Abramson et al. |
| 9,868,393 | B2 * | 1/2018 | Bahgat .............. B60W 50/0097 |
| 9,925,841 | B2 * | 3/2018 | Hrovat ............... B60G 17/0165 |
| 10,423,991 | B1 * | 9/2019 | Jeon ........................ H04W 4/44 |
| 10,430,883 | B1 | 10/2019 | Bischoff et al. |
| 10,462,608 | B1 | 10/2019 | Santarelli et al. |
| 10,664,917 | B1 | 5/2020 | Wasserman |
| 10,672,249 | B1 * | 6/2020 | Balakrishnan ......... G08B 21/18 |
| 10,732,635 | B2 * | 8/2020 | Haque .................. G05D 1/0274 |
| 10,745,025 | B2 * | 8/2020 | Köse .................... B60W 50/085 |
| 10,948,299 | B1 | 3/2021 | Zhang et al. |
| 11,137,832 | B2 * | 10/2021 | Katz ........................ G06F 3/017 |
| 11,361,379 | B1 | 6/2022 | Rodoni |
| 11,533,614 | B1 | 12/2022 | Russell et al. |
| 2011/0307188 | A1 * | 12/2011 | Peng ................. G01C 21/3697 702/33 |
| 2012/0046020 | A1 | 2/2012 | Tomasini |
| 2012/0139507 | A1 | 6/2012 | Ferguson |
| 2012/0274218 | A1 | 11/2012 | Mountain |
| 2014/0149145 | A1 | 5/2014 | Peng et al. |
| 2015/0363841 | A1 * | 12/2015 | Richie ................. G06Q 30/0282 705/347 |
| 2016/0091978 | A1 | 3/2016 | Park |
| 2016/0205238 | A1 | 7/2016 | Abramson et al. |
| 2017/0052028 | A1 | 2/2017 | Choudhury et al. |
| 2017/0186054 | A1 * | 6/2017 | Fish ........................ G06Q 50/40 |
| 2017/0220958 | A1 | 8/2017 | Schucan et al. |
| 2017/0265044 | A1 | 9/2017 | Lundsgaard et al. |
| 2019/0051287 | A1 | 2/2019 | Nomura et al. |
| 2019/0075201 | A1 | 3/2019 | Tu et al. |
| 2019/0075426 | A1 | 3/2019 | Nomura et al. |
| 2019/0102840 | A1 | 4/2019 | Perl et al. |
| 2019/0109843 | A1 | 4/2019 | Kimsey-Lin et al. |
| 2020/0200920 | A1 | 6/2020 | Irish et al. |
| 2020/0239982 | A1 * | 7/2020 | Yang ...................... C22B 61/00 |
| 2020/0252744 | A1 | 8/2020 | Kaneichi et al. |
| 2020/0265474 | A1 * | 8/2020 | Brown ............... G06Q 30/0267 |
| 2020/0363807 | A1 * | 11/2020 | Haque .................. G05D 1/0278 |
| 2021/0048541 | A1 | 2/2021 | Miller et al. |
| 2021/0142419 | A1 | 5/2021 | Davis et al. |

FOREIGN PATENT DOCUMENTS

| | | | | |
|---|---|---|---|---|
| CN | 110869807 A | * | 3/2020 | ......... G01C 21/1654 |
| CN | 111179578 A | * | 5/2020 | |
| CN | 210634476 U | * | 5/2020 | |
| EP | 3462403 A1 | * | 4/2019 | ............ B60W 40/09 |
| WO | WO-2019119597 A1 | * | 6/2019 | ........... H04N 5/2251 |

OTHER PUBLICATIONS

J. Wahlström, I. Skog and P. Händel, "Smartphone-Based Vehicle Telematics: A Ten-Year Anniversary," in IEEE Transactions on Intelligent Transportation Systems, vol. 18, No. 10, pp. 2802-2825, Oct. 2017, doi: 10.1109/TITS.2017.2680468.

Cambridge Mobile Telematics; "We make roads safer by making drivers better."; Date downloaded Nov. 16, 2020; https://www.cmtelematics.com.

U.S. Appl. No. 17/070,439, filed Feb. 8, 2024, Office Action.
U.S. Appl. No. 17/070,439 filed Jun. 25, 2024.

* cited by examiner

ALIGNING PROVIDER-DEVICE AXES WITH TRANSPORTATION-VEHICLE AXES TO GENERATE DRIVING-EVENT SCORES

BACKGROUND

In recent years, both popularity and usage of on-demand transportation information systems have increased. Indeed, the proliferation of web and mobile applications has enabled requesting devices to utilize on-demand transportation information systems to identify matches with provider devices and then coordinate across computing devices to initiate transportation from one geographic location to another. For instance, conventional systems can determine geographic locations across provider devices and requester devices, generate digital matches between provider devices and requester devices, and further track, analyze, and manage transportation and drop-off of requesters across computer networks. Despite recent advances, conventional on-demand transportation information systems continue to suffer from a number of disadvantages, particularly in their accuracy, efficiency, and safety.

SUMMARY

This disclosure describes one or more embodiments of methods, non-transitory computer-readable media, and systems that solve the foregoing problems in addition to providing other benefits. In particular, the disclosed systems can align axes for a provider device and a corresponding transportation vehicle based on the provider device's location and motion data as a basis for generating driving-event scores for particular driving events. More specifically, the disclosed systems can generate axes-rotation parameters that align axes of a provider device with axes of a transportation vehicle. By aligning provider-device axes with transportation-vehicle axes, the disclosed systems can attribute provider-device motion data (e.g., from an accelerometer, a gyroscope, and a GPS sensor) to motion of a transportation vehicle. Based on the movement of the transportation vehicle, the disclosed systems can further identify motion paths, motion patterns (e.g., various stops and turns), or other driving behaviors that occur during particular driving events, such as pick-up events or drop-off events. The disclosed systems can further generate driving-event scores based on the such motion paths or patterns associated with the driving events (e.g., harsh stops, abrupt turns). Based on the driving-event scores, the disclosed systems can customize a graphical user interface provided for display on a provider device or a requester device to indicate a provider rating, restrictions on pickup or drop-off locations, or other provider guidance.

BRIEF DESCRIPTION OF THE DRAWINGS

The detailed description refers to the drawings briefly described below.

DETAILED DESCRIPTION

Figure 1:
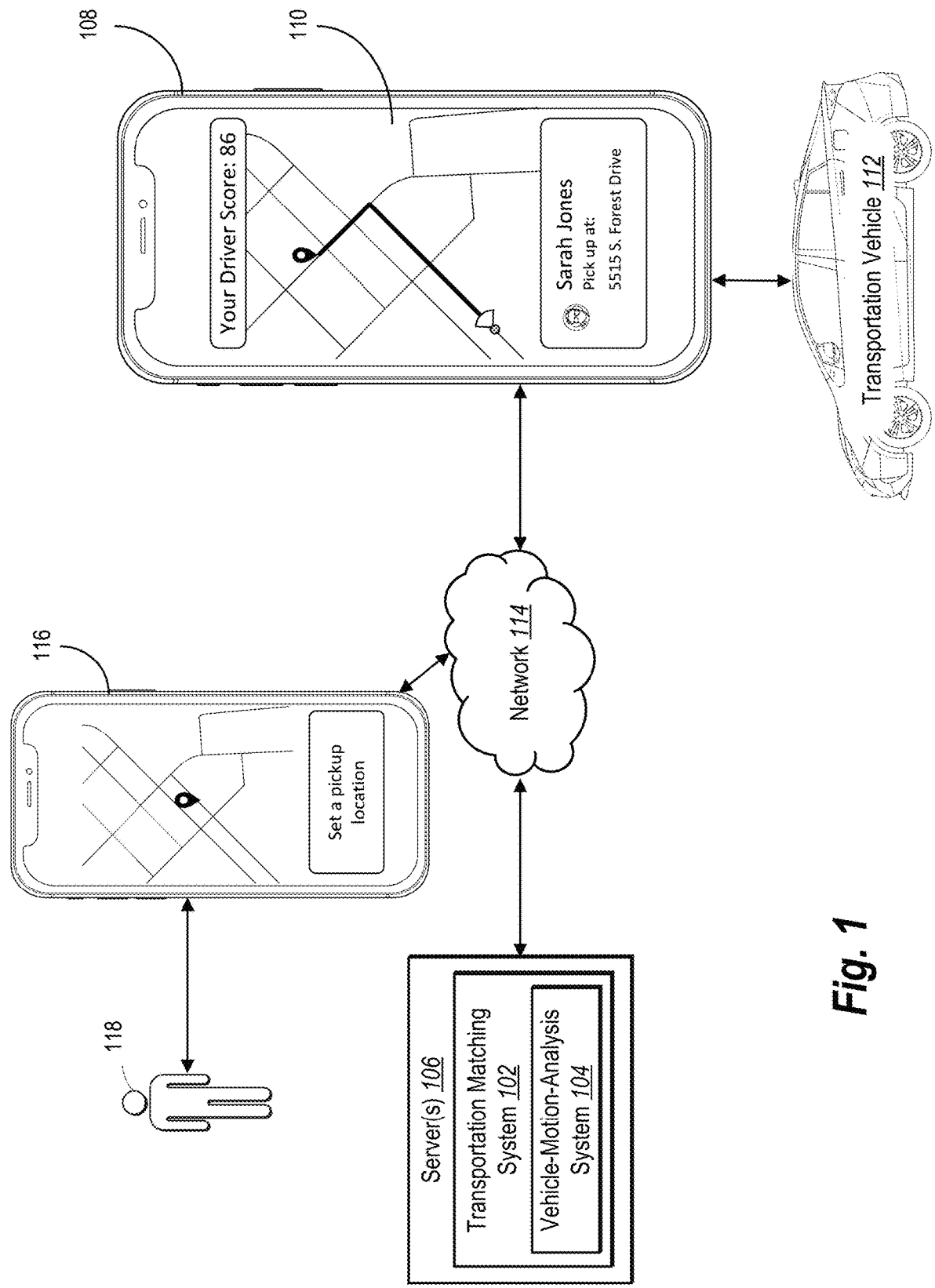
FIG. 1 illustrates a block diagram of an environment for implementing a transportation matching system and a vehicle-motion-analysis system in accordance with one or more embodiments.

This disclosure describes a vehicle-motion-analysis system that can determine driving-event scores based on driving behavior associated with a driving event. In particular, the vehicle-motion-analysis system can determine parameters from provider-device motion data to align axes for a provider device and a transportation vehicle to use a basis for determining driving-event scores for a driving event based on corresponding provider-device motion and location data. For example, the vehicle-motion-analysis system can attribute provider-device motion data to movement of a transportation vehicle by determining axes-rotation parameters that align a provider-device frame (e.g., three-dimensional axes defining an orientation of the provider device) with a transportation-vehicle frame (e.g., three-dimensional axes defining an orientation of the transportation vehicle). Based on location and motion data of the transportation vehicle during a pickup, drop off, or other driving event, the vehicle-motion-analysis system can determine a driving-event score for the driving event performed by the transportation vehicle.

As mentioned, the vehicle-motion-analysis system can utilize provider-device motion data to determine transportation-vehicle motion data. Because devices can move and rotate within a vehicle, the motion data of a provider device is not always directly attributable to motion of a transportation vehicle. But the vehicle-motion-analysis system can determine whether to align provider-device axes and vehicle axes based on a position or connectivity or a provider device. Before relying on provider device motion data to determine transportation-vehicle motion data, the vehicle-motion-analysis system can determine that the provider device is secure in place (e.g., with a fixed position and orientation) within the transportation vehicle (e.g., within a device mount). In some cases, the vehicle-motion-analysis system detects either a wireless network connection between a provider device and a device mount or a closed circuit between the provider device and the device mount before generating axes-rotation parameters for aligning axes.

Based on determining that the provider device is secure or otherwise provides a reliable reference point, the vehicle-motion-analysis system can determine a relationship between a frame of reference for a provider device and a frame of reference for a transportation vehicle. For instance, the vehicle-motion-analysis system can compare provider-device axes that define an orientation or pose of a provider device (e.g., as determined via accelerometer and gyroscope data) with transportation-vehicle axes that define an orientation or a pose of a transportation vehicle. Based on such a comparison, the vehicle-motion-analysis system can generate axes-rotation parameters for aligning the provider-device axes with the transportation-vehicle axes.

For the comparison, the vehicle-motion-analysis system can determine the provider-device axes by detecting provider-device location data and motion data. In some cases, the vehicle-motion-analysis system detects readings from provider-device components, such as an accelerometer, a gyroscope, and a GPS sensor. The vehicle-motion-analysis system can further determine the transportation-vehicle axes for comparing with the provider-device axes based on location data (e.g., GPS sensor readings) from the provider device. Because many transportation vehicles do not have components such as inertial measurement units ("IMUs"), accelerometers, gyroscopes, or GPS sensors accessible to transportation matching systems, the vehicle-motion-analysis system can determine transportation-vehicle axes for a transportation vehicle based on changes in location over time as determined by a GPS sensor of the provider device within the transportation vehicle.

For example, the vehicle-motion-analysis system can determine a three-dimensional frame or pose of a transportation vehicle based on a vertical-target acceleration, a lateral-target acceleration, and a linear-target acceleration for the transportation vehicle. To determine the target accelerations of the transportation vehicle, the vehicle-motion-analysis system can utilize location data from the provider device (e.g., GPS coordinate location readings). For instance, the vehicle-motion-analysis system can determine a linear-target acceleration based on a change in speed over time (e.g., the derivative of speed) as indicated by GPS location data from the provider device. The vehicle-motion-analysis system can also determine a lateral-target acceleration associated with a transportation vehicle. A lateral-target acceleration can indicate centripetal movement of the transportation vehicle based on a turn rate associated with the transportation vehicle (which is based on gyroscope readings and accelerometer readings from the provider device).

Indeed, the vehicle-motion-analysis system can utilize gyroscope data associated with a transportation vehicle. For example, the vehicle-motion-analysis system can receive gyroscope readings from a provider device to determine a target rotation of the transportation vehicle. The vehicle-motion-analysis system can also receive gyroscope data to determine a device rotation. The vehicle-motion-analysis system can further compare the device rotation with the target rotation as part of determining axes-rotation parameters for aligning provider-device axes with transportation-vehicle axes.

As mentioned, the vehicle-motion-analysis system can compare the transportation-vehicle axes with the provider-device axes based on various accelerations. In particular, the vehicle-motion-analysis system can compare accelerations that are specific to particular directions (e.g., vertical, lateral, and linear) which correspond to respective axes associated with a provider device and a transportation vehicle. Specifically, the vehicle-motion-analysis system can determine a lateral-device acceleration, a linear-device acceleration, and a vertical-device acceleration (e.g., via an accelerometer and a gyroscope on the provider device) to compare with corresponding target accelerations associated with the transportation vehicle. Additional detail regarding determining a transportation vehicle frame, determining a provider device frame, and generating a vehicle rotation matrix to align the two frames is provided below with reference to the figures.

Based on comparing three-dimensional acceleration data, in some embodiments, the vehicle-motion-analysis system generates axes-rotation parameters that indicate transformations to align the provider-device axes with the transportation-vehicle axes. By determining such parameters to align provider-device axes with transportation-vehicle axes, the vehicle-motion-analysis system can determine motion data and location data for a transportation vehicle performing a driving event. By applying the axes-rotation parameters to the provider-device location data and the provider-device motion data for a driving event, for instance, the vehicle-motion-analysis system can estimate transportation-vehicle-motion data and transportation-vehicle-location data for the driving event. In some embodiments, the vehicle-motion-analysis system analyzes such transportation-vehicle-motion data and transportation-vehicle-location data during a driving event to identify various motion paths or patterns of the transportation vehicle that reflect safety or convenience. Such motions may include slight directional changes, stops, turns (e.g., angle changes), accelerations, decelerations, waypoints, u-turns, lane changes, crossing bike lanes, crossing bus lanes, and pulling up to sidewalks or other locations for pick-ups, and drop-offs (which can also vary depending on location in cities, at airports, at bus stations, or near schools).

Based on the identified motion paths or patterns, the vehicle-motion-analysis system can determine a driving-event score for the driving event. For example, the vehicle-motion-analysis system can compare observed behavior, such as slight directional changes, stops, and turns of a transportation vehicle, with corresponding model behavior to determine how the transportation vehicle performs a particular driving event. Additionally, the vehicle-motion-analysis system can utilize various driving-event scores to determine how safe or viable particular locations are for pick-up or drop-off and/or to determine how competent providers are in their driving ability. For example, in some embodiments, the vehicle-motion-analysis system identifies harsh stops, abrupt turns, and/or a number of stops or starts (e.g., waypoints) in quick succession as a basis for a low driving-event score. Such a low driving-event score can indicate poor driving on the part of the provider and/or can indicate a difficult or unsafe location.

Additionally, the vehicle-motion-analysis system can utilize the driving-event scores to provide a customized graphical user interface for display on a client device. In particular, the vehicle-motion-analysis system can generate and provide various user interface elements that correspond to driving-event scores. For example, the vehicle-motion-analysis system can determine a provider rating for a provider based on one or more driving-event scores and can provide the provider rating for display within a provider graphical user interface on a provider device. In some embodiments, the vehicle-motion-analysis system provides a location-restriction element for display at a particular position within a provider graphical user interface presented on a provider device to indicate an unsafe location for a particular driving event (e.g., pick-up or drop-off) based on one or more driving-event scores. Additional detail regarding customizing various graphical user interfaces based on driving-event scores is provided below with reference to the figures.

As mentioned above, conventional on-demand transportation systems exhibit a number of disadvantages, especially with regard to accuracy, efficiency, and safety. For example, conventional on-demand transportation information systems often inaccurately determine location and motion information (e.g., speed and direction) of transportation vehicles. To determine location and motion information for vehicles, conventional systems usually generalize or approximate high-level vehicle movement based on device movement associated with computing devices within vehicles. In some cases, the movement of a computing device can inaccurately represent the actual motion of a vehicle, especially when it comes to slighter, more granular movements. When users manipulate or otherwise move computing devices within a vehicle, for example, conventional systems cannot accurately identify a vehicle's orientation along three-dimensional axes. As a result, conventional systems often can provide only a broad-level estimate of a transportation vehicle's movement but cannot use the device readings for more detailed applications due to the inconsistencies and human influence inherent in the device readings.

In addition to inaccurately determining a vehicle's motion information, many conventional on-demand transportation information systems also inefficiently determine motion of a vehicle indirectly based on computing device data. In particular, conventional systems often require excessive amounts of computing resources, such as processing power, memory, and processing time. For example, some conventional systems utilize algorithms that are slow to process motion information relating to transportation vehicles performing transportation events, such as picking up requesters or dropping off requesters. Indeed, experimenters have demonstrated that some conventional systems require excessive processing time to analyze motion information for transportation vehicles in a sample-by-sample fashion (e.g., where error is determined for each individual reading of motion information and then combined), which results in these systems being impractical for large-scale application.

Due at least in part to relying on inaccurate motion determinations for analysis, some conventional systems determine pick-up locations (or drop-off locations) that are slow, cumbersome, awkward, and/or unsafe for provider vehicles to navigate. Apart from identifying locations restricted by local authorities, conventional systems rely on such inaccurate motion information to identify seemingly safe or convenient pick-up locations or drop-off locations as safe, viable options. Because such locations often prove unsafe or inconvenient, conventional systems often receive large numbers of request cancelations and repeat or redundant transportation requests that stem from the request cancelations. For example, providers often fail to navigate to pick-up locations in a safe and timely manner due to the awkward navigation of some areas-which inaccurate motion data fail to indicate. Processing such large numbers of needless cancelations and redundant requests consumes excessive computing resources. Indeed, conventional systems often bear the exorbitant processing burden of multiple requests from a requester device, repeated processes for determining locations of the requester device and provider devices, multiple iterations of applying matching algorithms, repeated transmission of transportation matches to provider devices and requester devices, and repeated transmission of cancellation requests and notifications.

As suggested above, the disclosed vehicle-motion-analysis system provides several advantages and benefits over conventional on-demand transportation information systems. For instance, the vehicle-motion-analysis system improves the accuracy of determining motion and location for a transportation vehicle. While many conventional systems generalize or approximate vehicle movement only on a high level, the vehicle-motion-analysis system can determine much more granular motion information pertaining to a transportation vehicle. By determining axes-rotation parameters for aligning provider-device axes with transportation-vehicle axes, the vehicle-motion-analysis system can utilize telematics information from a provider device to determine more precise vehicle movement-without necessarily receiving such location or motion data directly from the transportation vehicle. For example, to determine axes-rotation parameters, the vehicle-motion-analysis system can compare target accelerations associated with a transportation vehicle with corresponding device accelerations and can also compare target rotations with device rotations.

In addition to improved accuracy, the vehicle-motion-analysis system improves the efficiency with which transportation matching systems determine a vehicle's motion. By vectorizing an optimization problem for aligning axes of a provider device with axes of a transportation vehicle, the vehicle-motion-analysis system simplifies and reduces the data upon which a system determines a vehicle's motion or location. Whereas some conventional systems implement algorithms that are slow to process motion information relating to transportation vehicles performing driving events (e.g., by combining errors determined for individual samples of collected motion data), the vehicle-motion-analysis system vectorizes the determination of provider-device axes and transportation-vehicle axes. As a result of the vectorization process, experimenters have demonstrated that the vehicle-motion-analysis system can improve the speed of pose estimation (e.g., determining provider-device axes and transportation-vehicle axes) by over 1000 times as compared to conventional brute force (i.e., non-vectorized) systems.

The vehicle-motion-analysis system further improves efficiency by reducing the computing resources required to perform iterative or repetitive processes that slow conventional systems. For example, the vehicle-motion-analysis system reduces the number of cancelations received by conventional systems that, due to their inaccuracy in determining vehicle motion information, often result in excessive numbers of cancelations on the part of both requesters and providers. In implementations of the vehicle-motion-analysis system, researchers have measured how to reduce accidents based on the system's driving-event scoring. By reducing accidents, the vehicle-motion-analysis system also reduces cancellations, repetitive requests from requester devices, duplicative processes of detecting and coordinating locations, repeat applications of matching algorithms, transmission of transportation matches across provider devices and requested devices, and transmission of cancellation requests and notifications. Thus, the vehicle-motion-analysis system reduces the computing resources for implementing computing systems.

In some embodiments, one or more sensory devices associated with a provider device are integral to the vehicle-motion-analysis system. For example, the vehicle-motion-analysis system relies on a GPS receiver, an accelerometer, and a gyroscope associated with a provider device to determine location and motion information relative to both the provider device itself as well as a transportation vehicle. The vehicle-motion-analysis system further relies on these sensory devices to generate axes-rotation parameters.

As indicated by the foregoing discussion, the present disclosure utilizes a variety of terms to describe features and advantages of the vehicle-motion-analysis system. For example, as used herein, the term "provider-device axes" (or simply "device axes") refers to a set of axes along which a provider computing device can accelerate, move, or orient. For example, provider-device axes may include three-dimensional axes (e.g., an x-axis, a y-axis, and a z-axis) that define a pose or a frame of reference for a provider device. The vehicle-motion-analysis system can determine provider-device axes based on location data and/or motion data associated with a provider device. In some embodiments, provider-device axes can include axes along which a provider device accelerates, such as a lateral-device acceleration (quantifying sideways or centripetal acceleration of the provider device), a linear-device acceleration (quantifying forward-backward acceleration of the provider device), and a vertical-device acceleration (quantifying an up-down gravitational acceleration of the provider device). In some embodiments, the vehicle-motion-analysis system determines the device accelerations based on receiving "motion data" (or variants such as "motion dataset"). Such motion data indicates movement of a provider device or a transportation vehicle. In some embodiments, motion data includes readings or data from an IMU, an accelerometer, and/or a gyroscope.

Relatedly, the term "transportation-vehicle axes" (or simply "vehicle axes") refers to a set of axes along which a transportation vehicle can accelerate, move, or orient. For example, transportation-vehicle axes may include three-dimensional axes (e.g., an x-axis, a y-axis, and a z-axis) that define a pose or a frame of reference for a transportation vehicle. The vehicle-motion-analysis system can determine transportation-vehicle axes by extrapolating motion information for the transportation vehicle from motion data and/or "location data" (or variants such as "location dataset"). Such location data indicate locations associated with a provider device or a transportation vehicle, such as GPS coordinates or other GPS data. In some embodiments, transportation-vehicle axes can include axes along which a transportation vehicle accelerates or is estimated to accelerate, such as a lateral-target acceleration (e.g., quantifying sideways or centripetal acceleration of the transportation vehicle), a linear-target acceleration (e.g., quantifying forward-backward acceleration of the transportation vehicle), and a vertical-target acceleration (e.g., quantifying an up-down gravitational acceleration of the transportation vehicle). In some embodiments, the vehicle-motion-analysis system determines one or more transportation vehicle accelerations based on receiving provider-device location data, such as GPS coordinate locations, attributing the provider-device GPS location data to the location of the transportation vehicle, and determining accelerations based on changes in a vehicle location over time.

As mentioned, the vehicle-motion-analysis system can generate axes-rotation parameters to align provider-device axes with transportation-vehicle axes (or vice-versa). As used herein, the term "axes-rotation parameters" refers to one or more parameters that indicate how to alter or modify one set of axes to align with another set of axes. Particularly, the axes-rotation parameters can indicate relationships between corresponding axes (two different x-coordinate axes, two different y-coordinate axes, and two different z-coordinate axes). For instance, axes-rotation parameters can include a rotation matrix or a transformation matrix that indicates what transformations or other modifications to make to a first set of axes (e.g., the provider-device axes) to align it with a second set of axes (e.g., the transportation-vehicle axes). In some embodiments, the vehicle-motion-analysis system can determine the axes-rotation parameters by comparing provider-device accelerations (e.g., a vertical-device acceleration, a linear-device acceleration, and a lateral-device acceleration) with target accelerations associated with a transportation vehicle. (e.g., a vertical-target acceleration, a linear-target acceleration, and a lateral-target acceleration).

As also mentioned above, the vehicle-motion-analysis system can generate a driving-event score for a driving event based on aligning provider-device axes with transportation-vehicle axes. As used herein, the term "driving event" refers to a movement, series of movements, or one or more stops within or related to a series of movements performed by a transportation vehicle. In some embodiments, a driving event includes a movement or series of movements defined by one or more event indicators. An event indicator may include, for instance, a pick-up indicator, a drop-off indicator, or a start indicator and an end indicator, such as a start time or location and an end time and location. For instance, a driving event can include a start time or location and an end time or location (as indicated by particular data signals from a provider device) that define the bounds of the driving event. Example driving events include pick-up events, drop-off events, crossing lanes, intersection crossings, turns, and other transportation events. In some cases, a pick-up event includes movements before or after a provider picks up a requester at a pick-up location and a drop-off event includes movements before or after a provider drops off a requester at a drop-off location. Between a start indicator and an end indicator, the vehicle-motion-analysis system can identify particular motion paths, motion patterns, or other driving behaviors, such as stops, turns, drop-offs, and/or pick-ups that the vehicle-motion-analysis system can use as a basis for generating a driving-event score. In some embodiments, the vehicle-motion-analysis system only determines motion data for transportation vehicles during driving events (e.g., between a start time/location and an end time/location) and overwrites or deletes the motion data afterward.

Relatedly, the term "driving-event score" refers to a score or rating for a particular driving event. In particular, a driving-event score can include a measure of safety, timeliness, comfort, reliability, or a combination thereof. For example, the vehicle-motion-analysis system can determine a driving-event score by comparing motion paths, motion patterns, or other driving behavior (e.g., stops and turns) that occur during a particular driving event with corresponding target driving-event motion for the same type of driving event at the same location. In some embodiments, the vehicle-motion-analysis system can utilize a driving-event score to determine a "provider rating" that indicates a rating for the driving ability or safety of a particular provider. In these or other embodiments, the vehicle-motion-analysis system can utilize a driving-event score to determine a "location rating" that indicates a rating for the safety or viability of a particular location to be used for that particular type of driving event (e.g., pick-up versus drop-off).

As suggested above, the term "transportation provider" (or simply "provider") refers to a driver or other person who operates a transportation vehicle and/or who interacts with a provider device, on the one hand, or an autonomous vehicle, on the other hand. For instance, a transportation provider includes a person who drives a transportation vehicle along various transportation routes—or an autonomous vehicle that drives along such transportation routes—to pick up and drop off requesters.

Relatedly, the term "provider device" refers to a computing device associated with (or used by) a provider or a transportation vehicle. In some embodiments, a provider device includes a provider application comprising instructions that (upon execution) cause the provider device to perform various actions for a transportation matching system, as described herein. Such instructions may likewise cause a provider device to present a graphical user interface including driving-event scores, provider ratings, or location ratings.

As suggested above, the term "transportation requester" (or simply "requester") refers to a person who submits (or is projected to submit) a transportation request to a transportation matching system and/or who interacts with a requester device. For instance, a transportation requester includes a person who interacts with a requester device to send a transportation request to a transportation matching system. After the transportation matching system matches a requester with a provider, the requester can await pickup by the provider at a predetermined pick-up location. Upon arrival of the provider, the requester can engage with the provider by getting into a transportation vehicle associated with the provider for transport to a destination specified in the requester's transportation request. Accordingly, a requester may refer to (i) a person who requests a ride or other form of transportation but who is still waiting for pick-up or (ii) a person whom a transportation vehicle has picked up and who is currently riding within the transportation vehicle to a destination.

Relatedly, the term "requester device" refers to a computing device associated with (or used by) a requester. In some embodiments, a requester device includes a requester application comprising instructions that (upon execution) cause the requester device to perform various actions for a transportation matching system, as described herein.

Additional detail regarding the vehicle-motion-analysis system will now be provided with reference to the figures. In particular, FIG. 1 illustrates a block diagram of a system environment for implementing a vehicle-motion-analysis system 104 in accordance with one or more embodiments. As shown in FIG. 1, the environment includes server(s) 106 housing the vehicle-motion-analysis system 104 as part of a transportation matching system 102. The environment of FIG. 1 further includes a provider device 108, a requester device 116 associated with a requester 118, a transportation vehicle 112 associated with the provider device 108, and a network 114. The server(s) 106 can include one or more computing devices to implement the vehicle-motion-analysis system 104. The provider device 108 may comprise any computing device as described in FIGS. 15-16. Additional description regarding the illustrated computing devices (e.g., the server(s) 106 and/or the provider device 108) is provided with respect to FIGS. 15-16 below.

As shown, the vehicle-motion-analysis system 104 utilizes the network 114 to communicate with the provider device 108. For example, the vehicle-motion-analysis system 104 communicates with the provider device 108 to match transportation requests received from the requester device 116 with the provider device 108. Indeed, the vehicle-motion-analysis system 104 can receive a transportation request from the requester device 116 and can provide request information to the provider device 108, such as a requested pick-up location, a requester identification (for the requester 118), and a requested pick-up time. In some embodiments, per device settings, the vehicle-motion-analysis system 104 receives device information from the provider device 108 such as location coordinates (e.g., latitude, longitude, and/or elevation) and status (currently riding, not riding, available, or unavailable) for matching requests.

To facilitate connecting requests with transportation vehicles (e.g., the transportation vehicle 112), in some embodiments, the vehicle-motion-analysis system 104 communicates with the provider device 108 (e.g., through a provider application 110). As indicated by FIG. 1, the provider device 108 includes the provider application 110. In many embodiments, the vehicle-motion-analysis system 104 communicates with the provider device 108 through the provider application 110 to, for example, receive and provide information including location data, motion data, and transportation request information (e.g., pick-up locations and/or drop-off locations).

As indicated above, the vehicle-motion-analysis system 104 can provide (or cause the provider device 108 to render) visual indicators within a graphical user interface associated with the provider application 110. For example, the vehicle-motion-analysis system 104 selects a provider associated with the provider device 108 to service a transportation request received from the requester device 116 based on various factors. Such factors may include a location associated with the transportation request, a provider-device location, locations of other provider devices, provider incentives, requester incentives, a time of day, traffic information, and/or other transportation-matching considerations. Based on selecting a provider associated with the provider device 108 to service the transportation request (and, in some cases, based on the provider device 108 accepting the request), the vehicle-motion-analysis system 104 provides a visual indicator for the transportation request (including a pick-up location and a route to the pick-up location) for display within a user interface on the provider device 108 (e.g., as part of the provider application 110). Further, in some embodiments, the vehicle-motion-analysis system 104 provides other user interface elements within graphical user interfaces of the provider application 110 (such as a driver score element) based on determining driving-event scores associated with the provider device 108 and/or various locations.

Although FIG. 1 illustrates the environment having a particular number and arrangement of components associated with the vehicle-motion-analysis system 104, in some embodiments, the environment may include more or fewer components with varying configurations. For example, in some embodiments, the vehicle-motion-analysis system 104 can communicate directly with the provider device 108, bypassing the network 114. In these or other embodiments, the vehicle-motion-analysis system 104 can be housed (entirely on in part) on the provider device 108. Additionally, the vehicle-motion-analysis system 104 can include or communicate with a database for storing information, such as provider-device location information, provider-device motion information, request information, and/or other information described herein.

Figure 2:
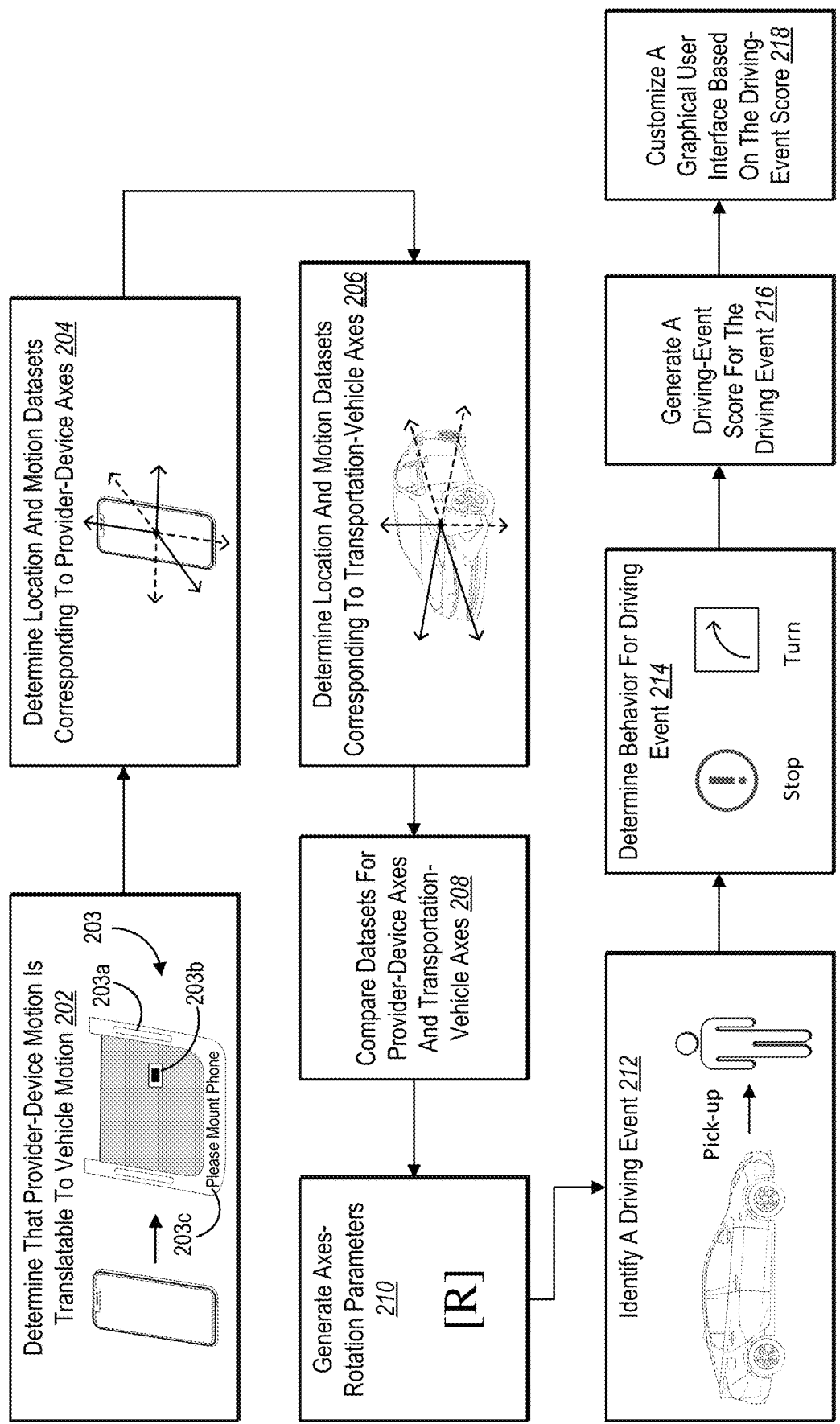
FIG. 2 illustrates determining driving-event scores by determining parameters that align provider-device axes with transportation-vehicle axes and applying the parameters to location and motion data for a driving event in accordance with one or more embodiments.

As mentioned, the vehicle-motion-analysis system 104 can provide a customized graphical user interface to a client device based on generating a driving-event score for a driving event. In particular, the vehicle-motion-analysis system 104 can determine a driving-event score based on rotation-axes parameters for aligning provider-device axes with transportation vehicle-axes and location and motion information for a driving event. FIG. 2 illustrates a sequence of acts 202-218 that the vehicle-motion-analysis system 104 performs to provide a customized graphical user interface based on aligning provider-device axes with transportation-vehicle axes to determine a driving-event score in accordance with one or more embodiments.

As illustrated in FIG. 2, the vehicle-motion-analysis system 104 performs an act 202 to determine that provider-device motion is translatable to vehicle motion. Particularly, the vehicle-motion-analysis system 104 determines that the motion data received from various components (e.g., an IMU, an accelerometer, and/or a gyroscope) of the provider device 108 is trustworthy and reliable to represent motion of the transportation vehicle 112. For example, the vehicle-motion-analysis system 104 determines that the frame of the provider device 108 is secure or fixed—e.g., that the provider device 108 is secure in place and/or orientation relative to (e.g., within) the transportation vehicle 112. In addition (or alternatively), the vehicle-motion-analysis system 104 determines that the provider device 108 is not being manipulated or otherwise hand-held by a provider.

In some embodiments, the vehicle-motion-analysis system 104 detects that the provider device 108 is attached to a mount 203 affixed to the transportation vehicle 112. For example, the vehicle-motion-analysis system 104 communicates with a mount (or carriage) that has a sensor 203b (e.g., touch sensor, a pressure sensor, or a photo sensor). Indeed, in response to a provider attaching the provider device 108 to the mount 203, the mount sensor indicates (or provides a signal that causes the provider device 108 to indicate) that the provider device 108 is attached (e.g., by indicating a closed circuit between the provider device 108 and the device mount), and the vehicle-motion-analysis system 104 receives a signal from the mount 203 indicating that the provider device 108 is attached to the mount 203. In some embodiments, the mount 203 includes one or more indicator lights 203a that is one color when the provider device 108 is attached and a different color (or not lit) when the provider device 108 is not attached. In these or other embodiments, the mount 203 includes a word indicator 203c that flashes, lights up, or otherwise prominently appears to prompt or otherwise indicate to the provider to attach the provider device 108 to the mount 203.

In one or more embodiments, the vehicle-motion-analysis system 104 detects a wireless network communication between the provider device 108 and the device mount. For example, the vehicle-motion-analysis system 104 utilizes a mount with a WiFi and/or a Bluetooth transceiver that can indicate via proximity (e.g., signal strength) and/or wireless network positioning techniques that the provider device 108 is fixed to the mount 203. If the vehicle-motion-analysis system 104 determines that the provider device 108 is not attached to the mount 203 (e.g., based on not detecting a signal from the provider device 108 or the mount 203), the vehicle-motion-analysis system 104 determines that the provider-device motion data is not translatable to transportation-vehicle motion.

In at least one embodiment, the vehicle-motion-analysis system 104 determines that the provider device 108 is secure or fixed in frame relative to the transportation vehicle 112 using a different technique. In some cases, the vehicle-motion-analysis system 104 monitors motion data (e.g., accelerometer data and/or gyroscope data) from the provider device 108 to determine that the provider device 108 is fixed or secure. For instance, the vehicle-motion-analysis system 104 utilizes an algorithm (in addition to or alternatively to an algorithm for determining whether the provider device 108 is fixed to the mount 203) to determine or detect hand-held motion of the provider device 108.

Indeed, in some embodiments, the vehicle-motion-analysis system 104 compares the movement of the provider device 108 with movement that would be expected (or modeled) for a device being manipulated in the hand of a user. For example, the vehicle-motion-analysis system 104 uses accelerometer data and/or a gyroscope data from the provider device 108 to classify periods of time as hand-held events. The vehicle-motion-analysis system 104 treats that task as a binary classification problem based on time series data.

For instance, the vehicle-motion-analysis system 104 trains a machine learning model on hand-held motion of devices (e.g., accelerometer data and/or gyroscope data for a period of time that is classified as hand-held motion event) and applies the trained machine learning model to provider-device motion data for a driving event to predict/classify the driving event as hand-held or not hand-held. In some embodiments, the vehicle-motion-analysis system 104 trains a machine learning model, such as an acceleration threshold model or a neural network (e.g., a convolutional neural network or a recursive neural network) based on one or more datasets of labeled data (e.g., frames of motion data labeled as hand-held or non-hand-held). For example, the vehicle-motion-analysis system 104 trains the machine learning model on datasets, such as Cambridge Mobile Telematics ("CMT") hand-held events, CMT harsh corner events, and/or Fleetcam-derived hand-held events.

In particular, the vehicle-motion-analysis system 104 identifies a particular period or duration of time for a driving event (e.g., between a start time and an end time of the event) and classifies the event as a hand-held event or a non-hand-held event based on the motion data for the duration of time. In some embodiments, the vehicle-motion-analysis system 104 utilizes a neural network to evaluate individual frames of a signal (e.g., a 25 Hz signal of provider-device motion data) to classify the frames as hand-held or not. In these or other embodiments, the vehicle-motion-analysis system 104 utilizes a neural network to evaluate the driving event as a whole (e.g., a continuous set of frames of provider-device motion data). Alternatively, in some embodiments, the vehicle-motion-analysis system 104 utilizes another type of machine learning model (e.g., an acceleration threshold model) to evaluate the driving event as a whole.

Thus, if the vehicle-motion-analysis system 104 determines that the movement of the provider device 108 matches the expected hand-held movement of a device, the vehicle-motion-analysis system 104 determines that the provider-device motion is not translatable to vehicle motion. For example, if the vehicle-motion-analysis system 104 applies a neural network and classifies the event as hand-held, the vehicle-motion-analysis system 104 determines that the provider-device motion data is not translatable to vehicle-motion data. Conversely, if the vehicle-motion-analysis system 104 applies a neural network and classifies the event as non-hand-held, then the vehicle-motion-analysis system 104 determines that the provider-device motion data is translatable to vehicle-motion data.

In one or more embodiments, the vehicle-motion-analysis system 104 determines that the provider device 108 does not move linearly, laterally, or vertically relative to a transportation vehicle, and/or determines that the provider device 108 does not rotate in any direction relative to the transportation vehicle. In some such embodiments, to determine that the provider device 108 is fixed, the vehicle-motion-analysis system 104 determines that the provider device 108 does not move or rotate for at least a threshold period of time. For instance, the provider device 108 may not necessarily be fixed in the mount 203 but may nevertheless be fixed relative to the transportation vehicle 112 (e.g., in a cupholder, on a car seat, or resting on a phone tray). However, if the vehicle-motion-analysis system 104 detects that the provider device 108 moves beyond a threshold distance and/or rotates beyond a threshold angle at any particular point within the threshold period of time, the vehicle-motion-analysis system 104 determines that the provider-device motion data is not translatable to motion of the transportation vehicle 112.

Based on determining that the provider device 108 is secure or fixed relative to the transportation vehicle 112, in some implementations, the vehicle-motion-analysis system 104 thus determines that the provider-device motion data is translatable to motion of the transportation vehicle 112. In response to determining that the provider-device motion data is translatable to transportation-vehicle motion, the vehicle-motion-analysis system 104 further performs an act 204 to determine a location dataset and a motion dataset corresponding to provider-device axes. For instance, the vehicle-motion-analysis system 104 determines provider-device axes based on receiving acceleration information from an accelerometer and rotation information from a gyroscope. More specifically, the vehicle-motion-analysis system 104 determines a linear-device acceleration, a lateral-device acceleration, and a vertical-device acceleration for the provider device 108. The vehicle-motion-analysis system 104 also determines a device rotation (e.g., around a vertical axis).

Relating to determining location information and motion information pertaining to a provider device and/or a transportation vehicle, in some embodiments, the vehicle-motion-analysis system 104 gathers and determines various location data and motion data described herein only in accordance with privacy considerations, regulations, and device settings. The vehicle-motion-analysis system 104 also enables providers associated with provider accounts to opt out of services which would require the determinations of such data. Further, the vehicle-motion-analysis system 104 deletes the location data and motion data regularly and/or immediately upon utilizing it to determine driving-event scores as described herein.

As illustrated in FIG. 2, the vehicle-motion-analysis system 104 further performs an act 206 to determine location data and motion data for transportation-vehicle axes. In some cases, the vehicle-motion-analysis system 104 determines GPS coordinate location data from a provider device 108 to indicate coordinate data for the transportation vehicle 112. Based on the provider-device location data, the vehicle-motion-analysis system 104 further determines or extrapolates target motion information for the transportation vehicle 112. For example, based on detecting changes in location over time, the vehicle-motion-analysis system 104 calculates a linear-target acceleration for the transportation vehicle 112.

As suggested above, in some embodiments, the vehicle-motion-analysis system 104 further determines a lateral-target acceleration and a vertical-target acceleration associated with the transportation vehicle 112. For example, the vehicle-motion-analysis system 104 utilizes gyroscope data from the provider device 108 to determine a lateral-target acceleration associated with the transportation vehicle 112. As a further example, the vehicle-motion-analysis system 104 determines a turn rate for the transportation vehicle 112 based on gyroscope data. Additionally, the vehicle-motion-analysis system 104 utilizes gravity data from the provider device 108 to determine a vertical-target acceleration associated with the transportation vehicle 112. The vehicle-motion-analysis system 104 utilizes the target accelerations of the transportation vehicle 112 as a baseline or a target dataset to compare with the provider-device motion dataset. Additional detail regarding determining the various target vehicle accelerations is provided below with reference to subsequent figures.

As further illustrated in FIG. 2, the vehicle-motion-analysis system 104 performs an act 208 to compare datasets for provider-device axes and transportation-vehicle axes. Indeed, the vehicle-motion-analysis system 104 compares the provider-device motion data that corresponds to the provider-device axes with target motion data that corresponds to the transportation-vehicle axes. For example, the vehicle-motion-analysis system 104 compares the linear-device acceleration with the linear-target acceleration, compares the lateral-device acceleration with the lateral-target acceleration, and compares the vertical-device acceleration with the vertical-target acceleration. Based on the comparison, the vehicle-motion-analysis system 104 determines relationships (e.g., differences) between the provider-device axes and the transportation-vehicle axes that the vehicle-motion-analysis system 104.

Additionally, the vehicle-motion-analysis system 104 performs an act 210 to generate axes-rotation parameters. More particularly, the vehicle-motion-analysis system 104 generates axes-rotation parameters for aligning the provider-device axes with the transportation-vehicle axes. For example, the vehicle-motion-analysis system 104 utilizes the relationships from the comparison of the act 208 to determine a target rotation of the transportation vehicle 112 (e.g., around a vertical axis) and a device rotation of the provider device 108 based on gyroscope data and/or other motion data. In one or more embodiments, the vehicle-motion-analysis system 104 determines other transformations to align the provider-device axes with the transportation-vehicle axes as well. In some embodiments, the vehicle-motion-analysis system 104 generates axes-rotation parameters in the form of a rotation matrix based on differences between the various provider-device accelerations and the target accelerations associated with the transportation vehicle 112 as well as the differences between the device rotation of the provider device 108 and the target rotation of the transportation vehicle 112. Additional detail regarding determining the axes-rotation parameters is provided below with reference to subsequent figures.

As shown further shown in FIG. 2, the vehicle-motion-analysis system 104 further performs an act 212 to identify a driving event associated with the transportation vehicle 112. To identify a driving event, the vehicle-motion-analysis system 104 detects an event indicator for the driving event. For example, the vehicle-motion-analysis system 104 may receive a pick-up indicator or a drop-off indicator from the provider device 108 (indicating a pick up or drop off of a requester) and identify a window of time or locations before and after a corresponding pickup or drop-off time or a pickup or drop-off location. As a further example, in some embodiments, the vehicle-motion-analysis system 104 detects a start indicator that corresponds to a start time when the vehicle-motion-analysis system 104 detects the start indicator. Additionally, the vehicle-motion-analysis system 104 detects an end indicator that corresponds to an end time at which the driving event terminates.

In one or more embodiments, the vehicle-motion-analysis system 104 detects a start indicator for a pick-up event by determining that the transportation vehicle 112 (or the provider device 108) is within a threshold distance of a pick-up location. Similarly, in some embodiments, the vehicle-motion-analysis system 104 detects a start indicator for a drop-off event by determining that the transportation vehicle 112 (or the provider device 108) is within a threshold distance of a drop-off location. Additionally, the vehicle-motion-analysis system 104 detects a start indicator for a transportation event by receiving a pick-up indicator from the provider device 108 to indicate that the transportation vehicle 112 has begun to service a transportation request (e.g., by indicating that a requester associated with a transportation request has been picked up).

In some embodiments, the vehicle-motion-analysis system 104 detects a start indicator using other techniques in addition (or alternatively) to those just described above. For example, the vehicle-motion-analysis system 104 detects a start indicator for a pick-up event or a drop-off event by detecting a change of direction (e.g., a turn) associated with the transportation vehicle 112 (or the provider device 108) that exceeds a threshold angle. For example, the vehicle-motion-analysis system 104 determines transportation-vehicle location data and transportation-vehicle motion data by applying the axes-rotation parameters to the provider-device location data and the provider-device motion data. Based on the transportation-vehicle location data and the transportation-vehicle motion data, the vehicle-motion-analysis system 104 identifies a change of direction, a change of location, a change of rotation, and/or a change of speed that indicate a driving event.

In conjunction with determining that the transportation vehicle 112 (or the provider device 108) is within a threshold distance of a pick-up location (or a drop-off location), the vehicle-motion-analysis system 104 can further utilize the threshold turn angle such that the start indicator includes determining that both conditions are satisfied (e.g., that the transportation vehicle 112 is within the threshold distance and makes a change of direction that exceeds a threshold angle). Additionally, the vehicle-motion-analysis system 104 detects a door close within a threshold distance of a pick-up location (e.g., by receiving an indication of gyroscopic wobble or roll detected from the provider device 108) in conjunction with a pick-up indicator to determine that service has begun for a transportation request (e.g., that a requester has been picked up).

As mentioned, in some embodiments, the vehicle-motion-analysis system 104 also detects an end indicator for a driving event. In particular, the vehicle-motion-analysis system 104 detects an end indicator for a pick-up event by receiving a pick-up indication from the provider device 108 and/or by detecting a door close within a threshold distance of a pick-up location. In some embodiments, however, the end of a pick-up event is not when the requester is picked up but rather once the transportation vehicle 112 reenters normal traffic flow after picking up the requester. Thus, vehicle-motion-analysis system 104 detects an end indicator by determining, after receiving a pick-up indication and/or after detecting a door close, that the transportation vehicle 112 (or the provider device 108) has traveled at least a threshold distance away from the pick-up location.

In addition, in some embodiments, the vehicle-motion-analysis system 104 detects an end indicator for a transportation event by determining that a drop-off event has started (e.g., by detecting a start indicator for a drop-off event). In some embodiments, however, the vehicle-motion-analysis system 104 detects an end indicator for a transportation event by receiving a drop-off indication from the provider device 108 (indicating that service has been completed and the requester has been dropped off) and/or by detecting a door close within a threshold distance of a drop-off location.

Similarly, the vehicle-motion-analysis system 104 detects an end indicator for a drop-off event by receiving a drop-off indication from the provider device 108 (indicating that service has been completed and the requester has been dropped off) and/or by detecting a door close within a threshold distance of a drop-off location. In one or more embodiments, however, the drop-off event does not end when the requester is dropped off but rather when the transportation vehicle 112 reenters normal traffic flow after dropping off the requester. Thus, the vehicle-motion-analysis system 104 detects an end indicator for a drop-off event by determining, after receiving a drop-off indication and/or detecting a door close at a drop-off location, that the transportation vehicle 112 (or the provider device 108) has traveled at least a threshold distance away from the drop-off location.

As further shown in FIG. 2, after or during a driving event, the vehicle-motion-analysis system 104 performs an act 214 to determine behavior for the driving event. In particular, the vehicle-motion-analysis system 104 identifies a motion path, a motion pattern, or other driving behavior of a transportation vehicle that occurs at particular locations during a driving event. Indeed, the vehicle-motion-analysis system 104 identifies a set of location coordinates corresponding to one or more event indicators (e.g., a pickup indicator, a drop-off indicator, or a start time and an end time) of a driving event and further determines various behaviors corresponding to the location coordinates. Example behaviors include motion paths or patterns indicating turns, stops, accelerations, decelerations, u-turns, drop-offs, and pick-ups. For instance, the vehicle-motion-analysis system 104 monitors provider-device motion data and location data to determine changes in direction and/or speed which can indicate stops and turns. Additional detail regarding how the vehicle-motion-analysis system 104 determines or identifies various behaviors is provided below with reference to subsequent figures.

Based on the behaviors that occur during a driving event, in some embodiments, the vehicle-motion-analysis system 104 further performs an act 216 to generate a driving-event score for the driving event. More particularly, the vehicle-motion-analysis system 104 scores or rates individual behaviors such as stops and turns. For example, based on the provider-device motion data and location data received during a driving event, the vehicle-motion-analysis system 104 determines how long the transportation vehicle 112 is stopped at a particular stop, where the transportation vehicle 112 stops or turns, how many times the transportation vehicle 112 stops or turns, and/or how harsh each stop or turn is.

Based on these factors, the vehicle-motion-analysis system 104 determines a driving-event score for the driving event. For example, the vehicle-motion-analysis system 104 determines a composite score for the various behaviors that occur during the driving event. Specifically, the vehicle-motion-analysis system 104 combines the individual behavior scores to determine an average score across the driving event to utilize as the driving-event score. In one or more embodiments, the vehicle-motion-analysis system 104 determines a driving-event score on a scale (e.g. from 1 to 10 or 1 to 100) or by labeling a driving event as poor, average, or good based on scores of constituent behaviors.

To determine driving-event scores, in some embodiments, the vehicle-motion-analysis system 104 compares stops and turns associated with the transportation vehicle 112 with corresponding model stops and model turns. Indeed, the vehicle-motion-analysis system 104 determines model behaviors (e.g., model stops and model turns) for driving events based on historical location data associated with various provider devices and transportation vehicles of the transportation matching system 102. For instance, the vehicle-motion-analysis system 104 can train a movement-machine-learning model (e.g., a neural network such as a deep neural network or a convolutional neural network) to generate model behavior data (e.g., model location data and model motion data) based on input locations and driving-event types (e.g., pick-up versus drop-off versus transportation) as well as ground truth model behavior data. Thus, the vehicle-motion-analysis system 104 can utilize the model behavior data to compare with transportation-vehicle location data and motion data to determine driving-event scores based on how close the transportation-vehicle location and motion data is to the model behavior data. Additional detail regarding training and implementing a movement-machine-learning model to determine driving-event scores is provided below with reference to subsequent figures.

Based on the driving-event score, in some cases, the vehicle-motion-analysis system 104 further generates a provider rating and/or a location rating. In particular, the vehicle-motion-analysis system 104 determines a provider rating to indicate a driving performance of the provider for the driving event. In some embodiments, the vehicle-motion-analysis system 104 utilizes the driving-event score as the provider rating. Over time, the vehicle-motion-analysis system 104 monitors provider ratings associated with the provider account (or the provider device 108) to determine an average provider rating that reflects a provider's driving ability or driving safety (e.g., overall or with respect to particular types of driving events). For instance, a provider that frequently has harsh stops, harsh accelerations, abrupt turns, performs out-of-the-ordinary maneuvers (e.g., reversing against traffic flow), and/or stops an excessive number of times to perform driving events may have a low provider rating. By contrast, a provider that exhibits smooth turns, gentle stops, and an appropriate number (e.g., below a threshold number) of stops may have a high provider rating.

In addition (or alternatively) to determining a provider rating based on a driving-event score, in some embodiments, the vehicle-motion-analysis system 104 determines a location rating based on a driving-event score. To elaborate, the vehicle-motion-analysis system 104 can determine a location rating that indicates a measure of safety or viability associated with a particular location (e.g., a pick-up location or a drop-off location). For example, the vehicle-motion-analysis system 104 determines, for a location, a location rating specific to a particular type of driving event (e.g., based on driving-event scores associated with driving events of the same type), or the vehicle-motion-analysis system 104 determines an overall location rating across all driving events.

In some embodiments, the vehicle-motion-analysis system 104 determines low location ratings for locations where transportation vehicles frequently make an excessive number of stops, perform out-of-the-ordinary maneuvers, make harsh stops, harsh accelerations, or abrupt turns. Similarly, the vehicle-motion-analysis system 104 can determine low location ratings for locations where transportation vehicles frequently have accidents. Over time, the vehicle-motion-analysis system 104 monitors location ratings for driving events that occur at particular locations. In one or more embodiments, the vehicle-motion-analysis system 104 determines a combined location rating by averaging location ratings (e.g., specific to a particular driving-event type or for all driving events at the location). If a location rating dips below a threshold location rating, the vehicle-motion-analysis system 104 determines that the location is unsafe or not viable for a particular type of driving event (or for all driving events).

As further illustrated in FIG. 2, the vehicle-motion-analysis system 104 performs an act 218 to customize a graphical user interface based on the driving-event score. More specifically, in some embodiments, the vehicle-motion-analysis system 104 provides a graphical user interface for display on the provider device 108 (or a requester device) that includes customized interface elements based on the driving-event score. For instance, the vehicle-motion-analysis system 104 provides a provider rating for display within a provider graphical user interface (of the provider application 110). Additionally (or alternatively), the vehicle-motion-analysis system 104 provides a location-restriction element that indicates a location that is unavailable to use for a particular driving event (e.g., pick-up or drop-off) based on its locating rating. Additional detail regarding providing a customized graphical user interface is provided below with reference to subsequent figures.

As mentioned, the vehicle-motion-analysis system 104 can determine provider-device axes based on provider-device motion data and location data. Additionally, the vehicle-motion-analysis system 104 can determine transportation-vehicle axes based on provider-device motion data and location data. In accordance with one or more embodiments, FIG. 3 illustrates provider-device axes 302 for the provider device 108 and transportation-vehicle axes 304 for the transportation vehicle 112.

Figure 3:
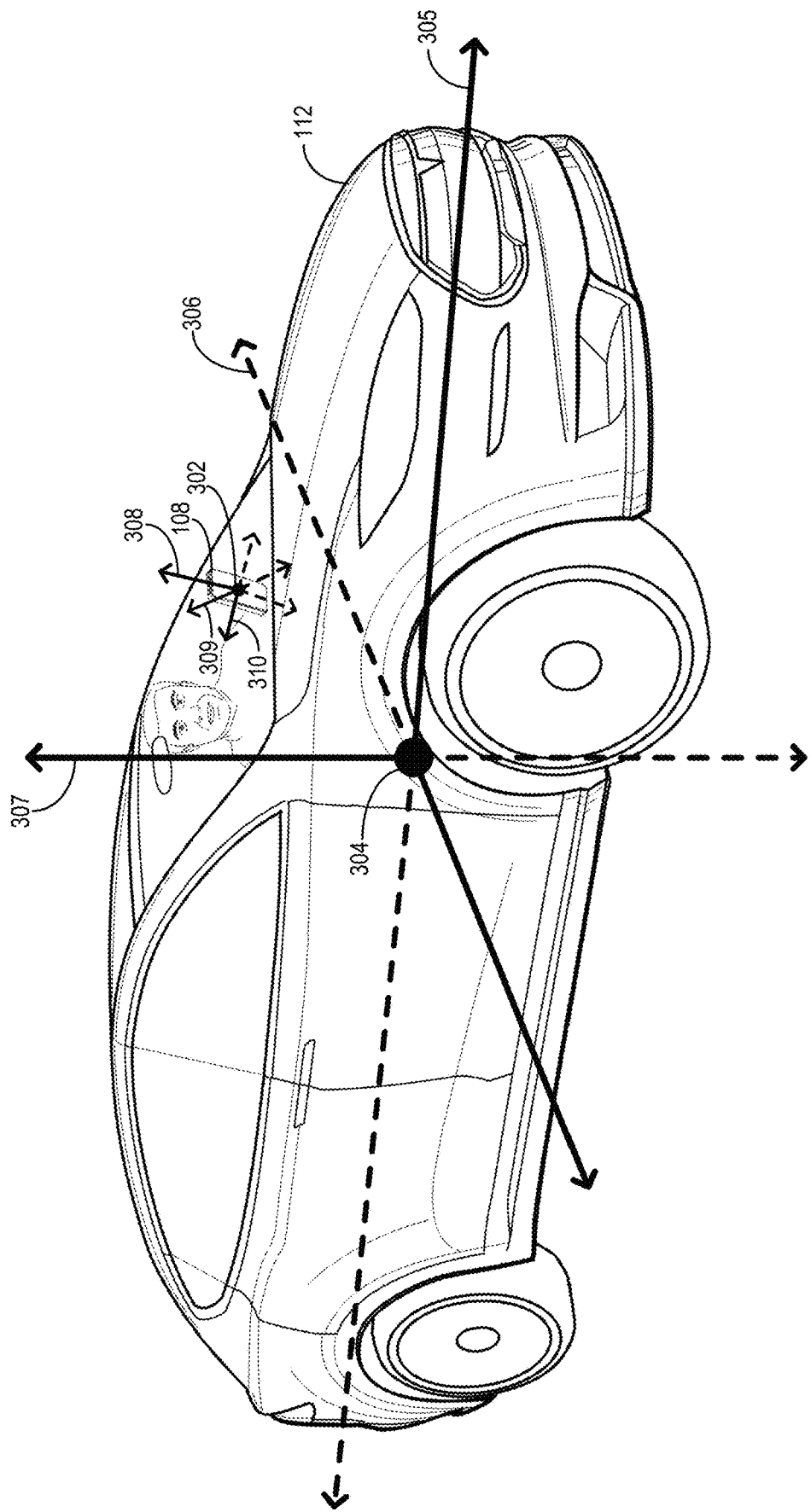
FIG. 3 illustrates a comparison of provider-device axes with transportation-vehicle axes in accordance with one or more embodiments.

As shown in FIG. 3, each axis of the provider device 108 and the transportation vehicle 112 has a positive portion (represented by a solid-line arrow) and a negative portion (represented by a dashed-line arrow) that extend in opposite directions. While FIG. 3 depicts the dashed and solid portions in a particular manner, other configurations are also possible. In one or more embodiments, each of the axes that make up the provider-device axes 302 represent axes for various accelerations associated with the provider device 108. For example, the vertical-device axis 308 (extending vertically through the top and bottom of the provider device 108) represents an axis for vertical-device acceleration. In addition, the linear-device axis 309 (extending perpendicular outward from the device display and in the opposite direction out of the back of the provider device 108) represents an axis for linear-device acceleration. Further, the lateral-device axis 310 (extending perpendicular from each lateral side of the provider device 108) represents an axis for lateral-device acceleration.

In a similar fashion, the transportation-vehicle axes 304 represent axes for accelerations associated with the transportation vehicle 112. For example, the vertical vehicle axis 307 (extending vertically up and down through the transportation vehicle 112) represents an axis for vertical-target acceleration associated with the transportation vehicle 112. In addition, the linear vehicle axis 305 (extending outwards in front and behind the transportation vehicle 112) represents an axis for linear-target acceleration associated with the transportation vehicle 112. Further, the lateral vehicle axis 306 (extending laterally from either side of the transportation vehicle 112) represents an axis for lateral-target acceleration associated with the transportation vehicle 112.

To generate the provider-device axes 302, the vehicle-motion-analysis system 104 determines provider-device location data and provider-device motion data. In some embodiments, the vehicle-motion-analysis system 104 determines provider-device location data and provider-device motion data in accordance with the following table:

| | GPS | Accelerometer | Gyroscope | Gravity (WIP) |
|---|---|---|---|---|
| Coordinate | Global | Local (Device) | Local (Device) | Local (Device) |
| Frequency | 1 Hz | 25 Hz | 25 Hz | 25 Hz |
| Measurements | Lat, Lng, Speed, Bearing | Accel in x, y, z | Gyro in x, y, z | Gravity in x, y, z |

To elaborate, the vehicle-motion-analysis system 104 receives (or requests or accesses) provider-device GPS data including measurements of latitude, longitude, speed (change in distance over time), and bearing associated with the provider device 108 at a frequency of 1 Hz. In addition, the vehicle-motion-analysis system 104 receives (or requests or accesses) provider-device accelerometer data such as accelerations in x, y, and z directions at a frequency of 25 Hz. Additionally, the vehicle-motion-analysis system 104 receives (or requests or accesses) provider-device gyroscope data in the form of gyroscopic rotational movement in the x, y, and z directions at a frequency of 25 Hz. Further, the vehicle-motion-analysis system 104 receives (or requests or accesses) provider-device gravity data in the x, y, and z directions at a frequency of 25 Hz. In some embodiments, the vehicle-motion-analysis system 104 receives or determines various location and/or motion data at frequencies (e.g., 15 Hz) other than those shown in the table.

To generate the transportation-vehicle axes 304, the vehicle-motion-analysis system 104 utilizes provider-device location data and provider-device motion data. In particular, the vehicle-motion-analysis system 104 extrapolates or calculates target location data and target motion data based on provider-device location data and provider-device motion data. To determine a linear-target acceleration for the transportation vehicle 112, for example, the vehicle-motion-analysis system 104 utilizes GPS speed data in accordance with:

$$Accel_{linear} = \frac{\Delta Speed}{\Delta t}$$

where t represents time, $Accel_{linear}$ represents the linear-target acceleration, and Speed represents speed as indicated by the GPS data (e.g., a rate of location change over time).

To determine a lateral-target acceleration for the transportation vehicle 112, the vehicle-motion-analysis system 104 utilizes gyroscope motion data and gravitational motion data (obtained via a filter applied to accelerometer data) from the provider device 108. Particularly, the vehicle-motion-analysis system 104 determines a lateral-target acceleration based on a turn rate of the transportation vehicle 112. In some embodiments, the vehicle-motion-analysis system 104 derives a turn rate associated with the transportation vehicle 112 based on gyroscope data and gravity data in accordance with:

$$TurnRate = \frac{gyro \cdot gravitiy}{\|gravity\|}$$

where gyro represents gyroscope motion data, gravity represents gravity data (from the table above), and TurnRate represents the transportation-vehicle turn rate. In some embodiments, the vehicle-motion-analysis system 104 determines TurnRate assuming the ground is flat or relatively flat (e.g., that the transportation vehicle 112 is not facing up, down, or sideways on a slope). In some cases, the gravity data is expressed in gravitational acceleration.

Based on the turn rate, the vehicle-motion-analysis system 104 further determines the lateral-target acceleration of the transportation vehicle 112. In particular the vehicle-motion-analysis system 104 determines the lateral acceleration in accordance with:

$$Accel_{lateral} = TurnRate * Speed$$

where TurnRate and Speed are defined above, and where $Accel_{lateral}$ represents the lateral-target acceleration for the transportation vehicle 112.

Further, in some embodiments, the vehicle-motion-analysis system 104 determines a vertical-target acceleration associated with the transportation vehicle 112. In particular, the vehicle-motion-analysis system 104 assumes that the transportation vehicle 112 is traveling on a flat surface or relatively flat surface, so the vertical-target acceleration is the acceleration of gravity (e.g., $-9.81$ m/s$^2$). For instance, the vertical-target acceleration is given by:

$$Accel_{vertical} = -9.81$$

where $Accel_{vertical}$ is the vertical-target acceleration of the transportation vehicle 112.

As further illustrated in FIG. 3, the provider-device axes 302 are different from (e.g., not aligned with) the transportation-vehicle axes 304. Indeed, as depicted in FIG. 3, the pose of the provider device 108 does not align with the pose of the transportation vehicle 112 because their acceleration data and gyroscopic data are not the same. Thus, the vertical-device axis 308 does not align with the vertical vehicle axis 307. In addition, the linear-device axis 309 does not align with the linear vehicle axis 305. Further, the lateral-device axis 310 does not align with the lateral vehicle axis 306.

Figure 4:
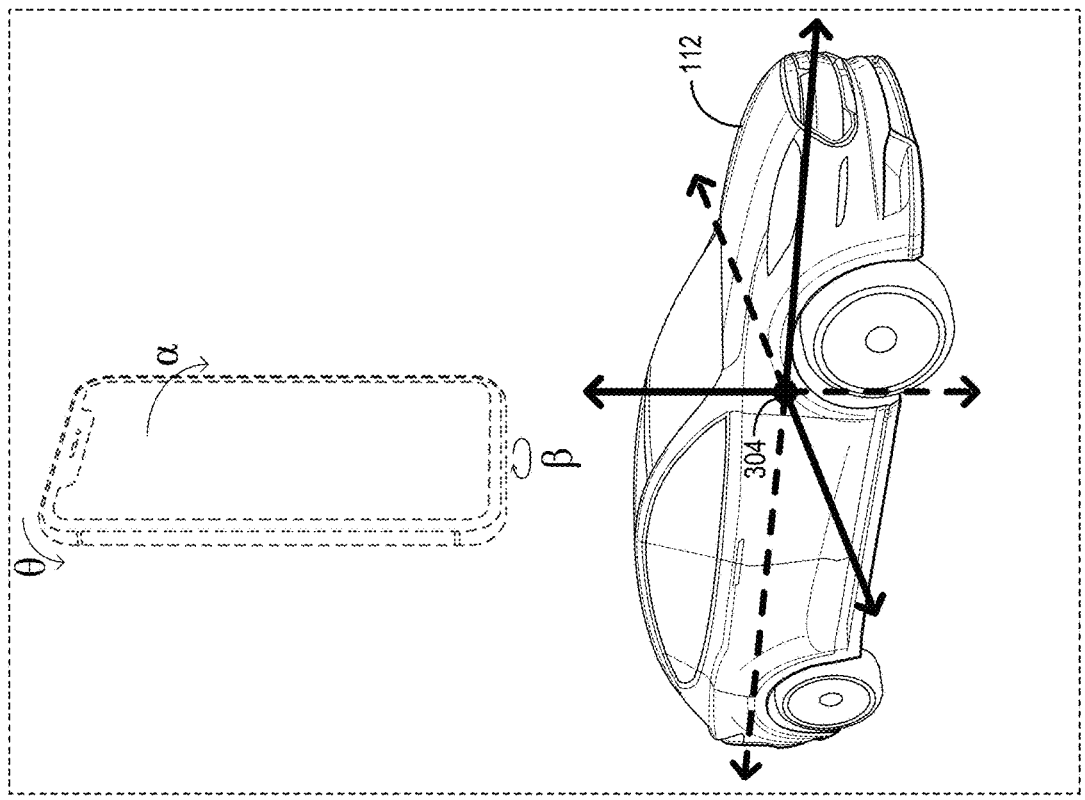
FIG. 4 illustrates rotation-axes parameters that align provider-device axes with transportation-vehicle axes in accordance with one or more embodiments.
Figure 4:
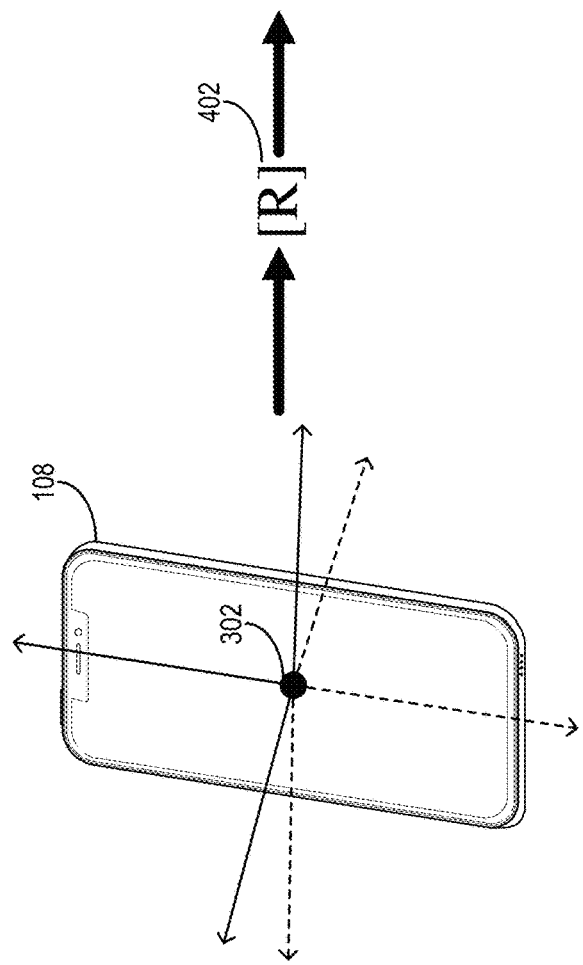

As described above, the vehicle-motion-analysis system 104 can determine that provider-device location data and provider-device motion data is translatable to motion of the transportation vehicle 112. Based on this determination, the vehicle-motion-analysis system 104 can align the provider-device axes 302 with the transportation-vehicle axes 304. Additionally, the vehicle-motion-analysis system 104 can then use provider-device motion data and location data to determine transportation-vehicle motion data and location data. In particular, the vehicle-motion-analysis system 104 can generate or determine axes-rotation parameters to align the provider-device axes 302 with the transportation-vehicle axes 304. FIG. 4 illustrates utilizing axes-rotation parameters 402 such as a rotation matrix to align the provider-device axes with the transportation-vehicle axes 304 in accordance with one or more embodiments.

As illustrated in FIG. 4, the vehicle-motion-analysis system 104 applies axes-rotation parameters 402 to align the provider-device axes 302 of the provider device 108 with the transportation-vehicle axes 304 of the transportation vehicle 112 (or vice-versa). More specifically, the vehicle-motion-analysis system 104 determines how to rotate the provider device 108 about each of the provider-device axes 302 to align with the transportation vehicle axes 304. For example, the vehicle-motion-analysis system 104 determines one or more relative angles between the provider-device axes 302 and transportation-vehicle axes 304 to align one or more such axes.

Indeed, as shown in FIG. 4, the vehicle-motion-analysis system 104 determines a relative angle θ indicating a degree to which the provider device 108 rotates about a linear axis (e.g., the linear-device axis 309). In addition, the vehicle-motion-analysis system 104 determines a relative angle α indicating a degree to which the provider device 108 rotates about a lateral axis (e.g., the lateral-device axis 310). Further, the vehicle-motion-analysis system 104 determines a relative angle β indicating a degree to which the provider device 108 rotates about a vertical axis (e.g., the vertical-device axis 308).

To determine the axes-rotation parameters 402, the vehicle-motion-analysis system 104 compares the provider-device axes 302 with the transportation-vehicle axes 304. By comparing such axes, the vehicle-motion-analysis system 104 determines relationships between corresponding axes such as angles between vertical axes, linear axes, and lateral axes. For example, the vehicle-motion-analysis system 104 determines which provider-device axes 302 align with which transportation-vehicle axes 304 through the comparison. Thus, in some embodiments, the vehicle-motion-analysis system 104 determines the axes-rotation parameters 402 as a rotation matrix in accordance with the relationship:

$$\text{Accel}_{target[3\times N]} = R_{3\times 3} \times \text{Accel}_{provider\ device[3\times N]}$$

where $\text{Accel}_{target[3\times N]}$ represents the target accelerations of the transportation vehicle 112 (corresponding to the transportation-vehicle axes 304), $R_{3\times 3}$ represents the axes-rotation parameters 402 (e.g., a rotation matrix), and $\text{Accel}_{provider\ device[3\times N]}$ represents device accelerations (corresponding to the provider-device axes 302).

In one or more embodiments, the vehicle-motion-analysis system 104 determines or generates the axes-rotation parameters 402 by utilizing an optimization problem. To elaborate, the vehicle-motion-analysis system 104 solves an optimization problem to determine target values-. By solving the optimization problem, in some cases, the vehicle-motion-analysis system 104 generates a target acceleration vector and a target gyroscope vector. For example, in some implementations, the vehicle-motion-analysis system 104 generates a target acceleration vector according to the following function:

$$\text{Accel}_{target[3\times N]} = [\text{Accel}_{lateral}, \text{Accel}_{linear}, \text{Accel}_{vertical}]$$

where the terms $\text{Accel}_{lateral}$, $\text{Accel}_{linear}$, and $\text{Accel}_{vertical}$ are defined as described above. In some embodiments, the vehicle-motion-analysis system 104 solves the optimization problem based on an assumption that the transportation vehicle 112 is moving on a flat surface or relatively flat surface. In some embodiments, however, the vehicle-motion-analysis system 104 accounts for variations in pitch and roll that occur as the transportation vehicle 112 travels over non-flat surface, such as hills and slopes. Indeed, as the transportation vehicle 112 travels up a hill, for example, the vehicle-motion-analysis system 104 accommodates the corresponding change in the transportation-vehicle axes 304 by adjusting the provider-device axes 302 accordingly. To account for such variations in pitch and roll, the vehicle-motion-analysis system 104 utilizes a different definition for $\text{Gyro}_{target}$ than the one provided below. For example, the vehicle-motion-analysis system 104 does not fix the x and y values to 0, but instead determines the values based on sensory readings from a gyroscope on the provider device 108.

Further, the vehicle-motion-analysis system 104 determines particular gyroscope data values. In some cases, the vehicle-motion-analysis system 104 determines such gyroscope data values based on the assumption that the transportation vehicle 112 is traveling on a flat surface (or relatively flat surface) and will therefore only rotate about one axis. Thus, in certain implementations, the vehicle-motion-analysis system 104 utilizes the optimization problem to generate a target gyroscope vector given by:

$$\text{Gyro}_{target} = [0, 0, -\text{TurnRate}]$$

where $\text{Gyro}_{target}$ represents target gyroscope data for a transportation vehicle and TurnRate is defined as described above.

To generate the target acceleration vector $\text{Accel}_{target[3\times N]}$ from target acceleration data and the target gyroscope vector $\text{Gyro}_{target}$ from target gyroscope data, the vehicle-motion-analysis system 104 implements an optimization function to minimize a difference between provider-device motion data (e.g., acceleration data and gyroscope data received from the provider device 108) and target motion data (e.g., target acceleration data and target gyroscope data determined as described above). Indeed, the vehicle-motion-analysis system 104 compares the provider-device motion data with the target motion data at different orientations (e.g., over a variety of possible quaternions) to discover or identify an orientation where the provider-device axes 302 and the transportation-vehicle axes 304 align. Additionally, the vehicle-motion-analysis system 104 utilizes the optimization function to minimize the difference. For example, the vehicle-motion-analysis system 104 utilizes an optimization function of the form:

$$\min_R \left( \sum_{i=1}^{N-1} \| R \times \text{Accel}_{providerdevice,i} - \text{Accel}_{target,i} \|_2^2 + \sum_{i=1}^{N-1} \| \times \text{Gyro}_{providerdevice,i} - \text{Gyro}_{target,i} \|_2^2 \right)$$

where $\text{accel}_{provider\ device,i}$ represents acceleration data for the provider device 108 at an $i^{th}$ orientation of N possible orientations, $\text{accel}_{target,i}$ represents target acceleration data for the transportation vehicle 112 at the $i^{th}$ orientation, $\text{gyro}_{provider\ device,i}$ represents gyroscope data for the provider device 108 at the $i^{th}$ orientation, $\text{gyro}_{target,i}$ represents target gyroscope data for the transportation vehicle 112 at the $i^{th}$ orientation, and R represents the axes-rotation parameters 402.

In one or more embodiments, the vehicle-motion-analysis system 104 applies a relative gyroscope weight to balance errors associated with the optimization function. For example, the vehicle-motion-analysis system 104 utilizes a weighted optimization function as follows:

$$\min_R \left( \sum_{i=1}^{N-1} \|R \times \text{Accel}_{providerdevice,i} - \text{Accel}_{target,i}\|_2^2 + \right.$$
$$\left. \sum_{i=1}^{N-1} \|R \times \text{Gyro}_{providerdevice,i} - \text{Gyro}_{target,i}\|_2^2 * w \right)$$

where w is the relative gyroscope weight. In some embodiments, the optimization function is non-convex as R has to be a valid rotation matrix.

In some embodiments, the vehicle-motion-analysis system 104 vectorizes the optimization function to improve efficiency. Indeed, as described above, conventional non-vectorized systems are slow to process motion data. By vectorizing the optimization function, the vehicle-motion-analysis system 104 improves the speed of generating the axes-rotation parameters 402 by over 1000 times. For instance, the vehicle-motion-analysis system 104 vectorizes the optimization function to form a provider-device acceleration vector (or matrix) and a provider-device gyroscope vector (or matrix) of the forms:

$$\text{Accel}_{providerdevice} = \begin{bmatrix} \text{Accel}_{providerdevice,x,0}, & \ldots, & \text{Accel}_{providerdevice,x,N-1} \\ \text{Accel}_{providerdevice,x,0}, & \ldots, & \text{Accel}_{providerdevice,x,N-1} \\ \text{Accel}_{providerdevice,x,0}, & \ldots, & \text{Accel}_{providerdevice,x,N-1} \end{bmatrix}$$

and $$\text{Gyro}_{providerdevice} = \begin{bmatrix} \text{Gyro}_{providerdevice,x,0}, & \ldots, & \text{Gyro}_{providerdevice,x,N-1} \\ \text{Gyro}_{providerdevice,x,0}, & \ldots, & \text{Gyro}_{providerdevice,x,N-1} \\ \text{Gyro}_{providerdevice,x,0}, & \ldots, & \text{Gyro}_{providerdevice,x,N-1} \end{bmatrix}.$$

In addition to the provider-device vectors or matrices, in some embodiments, the vehicle-motion-analysis system 104 further generates target vectors or matrices. In particular, the vehicle-motion-analysis system 104 generates a target acceleration vector (or matrix) and a target gyroscope vector (or matrix) of the forms:

$$\text{Accel}_{target} = \begin{bmatrix} \text{Accel}_{lateral,0}, & \ldots, & \text{Accel}_{lateral,N-1} \\ \text{Accel}_{lateral,0}, & \ldots, & \text{Accel}_{lateral,N-1} \\ \text{Accel}_{vertical,0}, & \ldots, & \text{Accel}_{vertical,N-1} \end{bmatrix}$$

and $$\text{Gyro}_{target} = \begin{bmatrix} 0, & \ldots, & 0 \\ 0, & \ldots, & 0 \\ \text{TurnRate}_0, & \ldots, & \text{TurnRate}_{N-1} \end{bmatrix}.$$

Further, based on the provider-device vectors and the target vectors, the vehicle-motion-analysis system 104 generates and solves a vectorized optimization function to compare provider-device motion data with target motion data. For instance, the vehicle-motion-analysis system 104 implements a vectorized optimization function as follows:

$$\min_R \|R \times \text{Accel}_{providerdevice}, \text{Gyro}_{providerdevice} - [\text{Accel}_{target}, \text{Gyro}_{target}]\|_F$$

where F represents the Frobenius norm or the Euclidean norm.

Similar to the discussion of optimization functions above, the vehicle-motion-analysis system 104 further applies relative gyroscope weights to the vectorized optimization function to balance errors. In particular, in some embodiments, the vehicle-motion-analysis system 104 implements a weighted vectorized optimization function as given by:

$$\min_R$$
$$\|R \times [\text{Accel}_{providerdevice}, w * \text{Gyro}_{providerdevice}] - [\text{Accel}_{target}, w * \text{Gyro}_{target}]\|_F$$

Figure 5:
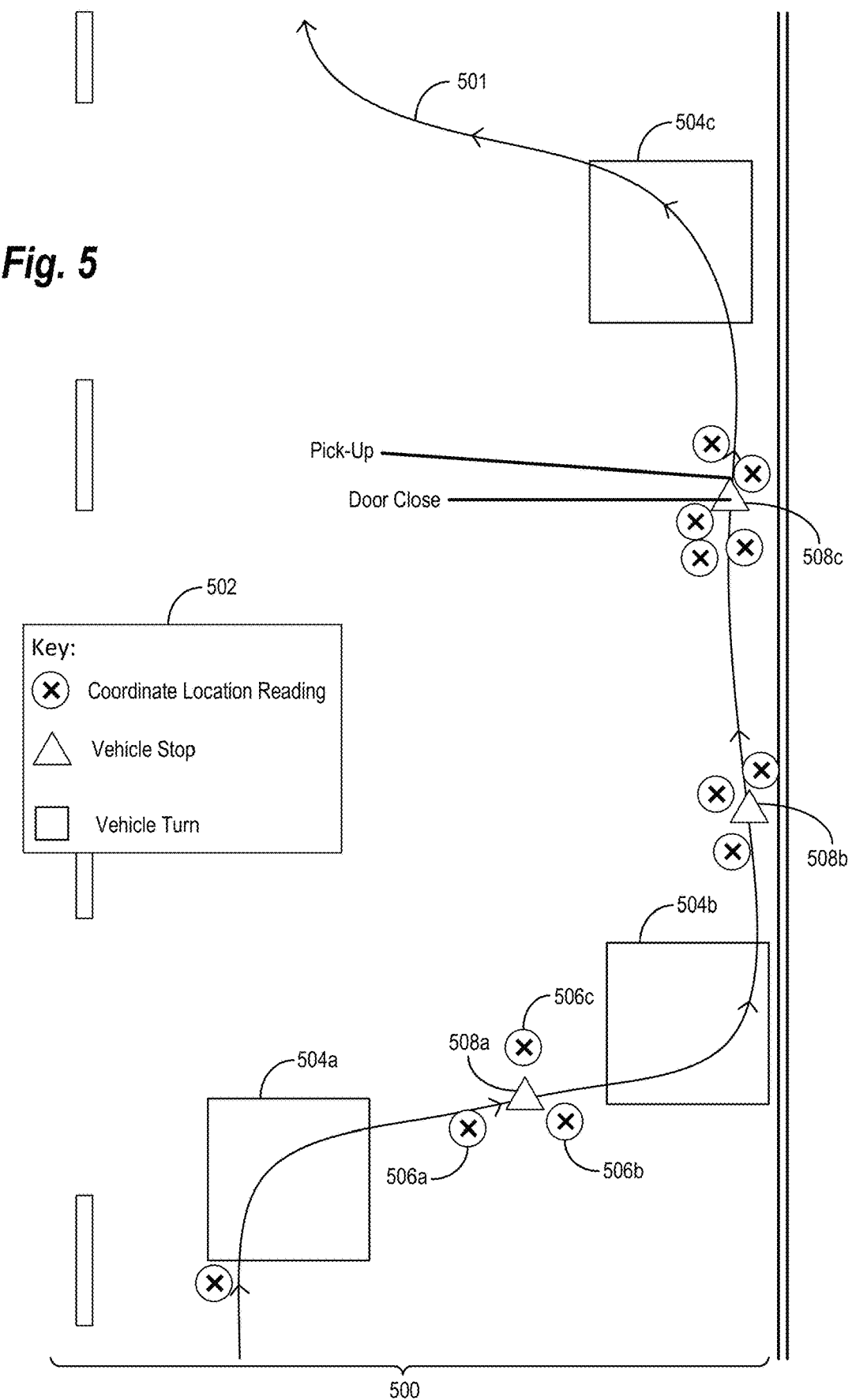
FIG. 5 illustrates determining a driving-event score for a driving event in accordance with one or more embodiments.

Based on generating the axes-rotation parameters 402 by implementing the optimization function, as illustrated in FIG. 4, the vehicle-motion-analysis system 104 aligns the provider-device axes 302 with the transportation-vehicle axes 304. Utilizing the aligned axes, the vehicle-motion-analysis system 104 can utilize provider-device location data and provider-device motion data to determine corresponding vehicle-location data and vehicle-motion data. More specifically, the vehicle-motion-analysis system 104 receives provider-device motion data and provider-device location data and applies the axes-rotation parameters 402 to the data to generate corresponding vehicle-motion data and vehicle-location data. FIG. 5 illustrates determining various vehicle-location data and vehicle-motion data for a particular driving event in accordance with one or more embodiments.

As illustrated in FIG. 5, the vehicle-motion-analysis system 104 determines or identifies various stops, turns, and other behaviors of the transportation vehicle 112 during a driving event. Indeed, the vehicle-motion-analysis system 104 determines the behaviors based on a provider-device location dataset and a provider-device motion dataset associated with the driving event. For instance, FIG. 5 illustrates a pick-up event for the transportation vehicle 112, where the vehicle-motion-analysis system 104 determines slight, detailed movements of the transportation vehicle 112 based on the data received from the provider device 108. For example, the vehicle-motion-analysis system 104 detects, for the transportation vehicle 112 traveling along a travel path 501 down a traffic lane 500, slight directional changes, decelerations, accelerations, stops, and starts. In at least one embodiment, the vehicle-motion-analysis system 104 provides the travel path 501 and/or indications of different behaviors (e.g., stops, turns) for display within a graphical user interface on the provider device 108 (or a requester device).

The vehicle-motion-analysis system 104 further generates a vehicle-location dataset and a vehicle-motion dataset that indicate the behaviors during the driving event. For example, the vehicle-motion-analysis system 104 generates a vehicle-location dataset and a vehicle-motion dataset to include turns, stops, accelerations, and decelerations (and locations associated with each). As shown in FIG. 5, the vehicle-motion-analysis system 104 identifies stops, such as the vehicle stop 508a, the vehicle stop 508b, and the vehicle stop 508c. The key 502 in FIG. 5 illustrates that triangles represent the vehicle stops 508a-508c.

To identify a vehicle stop, the vehicle-motion-analysis system 104 determines various coordinate location readings (represented by the circles with "x"s inside them) and determines a composite location coordinate between or among the coordinate location readings. To identify the vehicle stop 508a, for instance, the vehicle-motion-analysis system 104 receives coordinate location readings 506a-506c from the provider device 108. By determining that the transportation vehicle 112 is not moving (e.g., via accelerometer data), and by receiving the location readings 506a-506c during the time that the transportation vehicle 112 is not moving, the vehicle-motion-analysis system 104 can identify the stop location of the vehicle stop 508a. Specifically, the vehicle-motion-analysis system 104 can determine an average location (e.g., a center of mass) between or among the coordinate location readings 506a-506c as a stop location for the vehicle stop 508a.

As further shown in FIG. 5, the vehicle-motion-analysis system 104 also identifies turns associated with the driving event. For example, as indicated by the rectangles along the travel path 501, the vehicle-motion-analysis system 104 determines locations where the transportation vehicle 112 changes direction, as indicated by accelerometer and/or gyroscope data. Indeed, the vehicle-motion-analysis system 104 determines turns 504a-504c based on detecting at least a threshold change of direction associated with the transportation vehicle 112.

As further shown in FIG. 5, in some embodiments, the vehicle-motion-analysis system 104 identifies a door of a transportation vehicle closing as part of the driving event. For example, the vehicle-motion-analysis system 104 identifies a stop location (e.g., for the vehicle stop 508c) where gyroscope and/or accelerometer data indicate a change in roll and/or pitch along corresponding axes that indicates a person closing a door and/or a trunk of the transportation vehicle 112. In some embodiments, the vehicle-motion-analysis system 104 determines a side of the transportation vehicle 112 where the door was closed to determine which side a requester entered the transportation vehicle 112.

As illustrated in FIG. 5, in certain implementations, the vehicle-motion-analysis system 104 identifies a pick-up location associated with the driving event. In particular, the vehicle-motion-analysis system 104 receives an indication from the provider device 108 that the provider has picked up the requester at a particular location and begun transportation. In some embodiments, the vehicle-motion-analysis system 104 uses multiple signals together to identify a pick-up (or a drop-off) location. Indeed, the vehicle-motion-analysis system 104 may utilize more data signals from the provider device 108 indicating a pick-up location. For example, in some cases, the vehicle-motion-analysis system 104 determines a pick-up location based on the pick-up indication in conjunction with a door close and/or identifying a stop location (e.g., for the vehicle stop 508c).

In addition to those behaviors illustrated in FIG. 5, the vehicle-motion-analysis system 104 can determine other behaviors for a driving event as well. For example, the vehicle-motion-analysis system 104 can identify accelerations and decelerations associated with the transportation vehicle 112. Indeed, the vehicle-motion-analysis system 104 can receive accelerometer data that indicates accelerations and decelerations. The vehicle-motion-analysis system 104 can likewise detect slight directional changes and starts (e.g., waypoints) as part of driving behavior for a driving event.

In some embodiments, the vehicle-motion-analysis system 104 utilizes vehicle-location data and vehicle-motion data (including rotation data) to determine additional or alternative behaviors for a driving event. For instance, the vehicle-motion-analysis system 104 utilizes vehicle-location data and vehicle-motion data to track a location and/or a path of the transportation vehicle 112 at a fine level of detail (e.g., to the nearest foot or the nearest meter). In addition, the vehicle-motion-analysis system 104 identifies when the transportation vehicle 112 is stopped. Further, the vehicle-motion-analysis system 104 determines a current or a historic orientation of the transportation vehicle 112 during transport of a requester. Implementations of the vehicle-motion-analysis system 104 provide indications for locations, paths, and/or orientations (current or historic) for display within a graphical user interface (e.g., on the provider device 108 or the requester device 116).

In some embodiments, the vehicle-motion-analysis system 104 utilizes vehicle-location data and vehicle-motion data (including rotation data) to generate or determine routes. Particularly, the vehicle-motion-analysis system 104 generates a pick-up route (e.g., a route from a provider-device location to a pick-up location) or a destination route (e.g., a route from a pick-up location to a destination). To determine a route, the vehicle-motion-analysis system 104 identifies areas that have a higher likelihood of accidents, slowdowns, sharp turns, or rough roads due to construction based on historical vehicle-location data and historical vehicle-motion data.

Indeed, as described herein, the vehicle-motion-analysis system 104 determines location ratings for areas based on vehicle-location data and vehicle-motion data. In some embodiments, a location rating can indicate or represent a probability of one or more of an accident, a slowdown, one or more sharp turns, or rough roads due to construction. Based on location ratings, the vehicle-motion-analysis system 104 determines a route to exclude areas with low (e.g., below a threshold) location ratings and/or to include areas with high (e.g., above a threshold) location ratings. Thus, the vehicle-motion-analysis system 104 generates routes to avoid accidents, slowdowns, sharp turns, or rough roads. In some embodiments, the vehicle-motion-analysis system 104 generates a route to avoid these obstacles while still keeping the route within a threshold route time as compared to a fastest possible (e.g., baseline) route determined without these considerations.

Further, the vehicle-motion-analysis system 104 can utilize vehicle-motion data and vehicle-location data to identify risky behavior. In particular, the vehicle-motion-analysis system 104 utilizes a machine learning model to classify events as safe or unsafe (or to determine probabilities of accidents occurring). For example, the vehicle-motion-analysis system 104 trains a machine learning model based on labeled location and motion data (labeled as relating to an accident or not relating to an accident) and applies the machine learning model to vehicle-motion data and vehicle-location data for an event to classify the event accordingly (or to determine an accident probability). Additional detail regarding training a machine learning model to predict accident probabilities is provided below with reference to FIG. 8.

Based on identifying or classifying risky behavior of a provider, the vehicle-motion-analysis system 104 can provide a notification to the provider device 108 to indicate the risky behavior to the provider. For example, the vehicle-motion-analysis system 104 generates and provides a push notification or an in-app notification (e.g., as part of the provider application 110) to pop up for display on the provider device 108. In these or other embodiments, the vehicle-motion-analysis system 104 generates and provides an audio notification to play via the provider device 108 to alert the provider of risky behavior. For example, the vehicle-motion-analysis system 104 notifies a provider when the provider makes too many abrupt turns or stops within a single event (or within a time period), when the provider is in the wrong lane for entering an airport pick-up zone, when the provider is tailgating, and/or when the provider drifts between lanes (or into a bike lane or a bus lane).

In one or more embodiments, the vehicle-motion-analysis system 104 utilizes vehicle-location data and vehicle-motion data for specific applications that are location-based. In particular, the vehicle-motion-analysis system 104 determines that the provider device 108 is at or near an airport and/or that the provider device 108 is selected to service a transportation request with a pick-up location (or a drop-off location) at an airport. The vehicle-motion-analysis system 104 further determines and monitors vehicle-location data and vehicle-motion data for a driving event at the airport to help the provider navigate airport traffic. Indeed, based on historical data for various transportation vehicles, the vehicle-motion-analysis system 104 can determine which lanes are for pick-up and which lanes are for drop-off at particular airports (or even particular terminals) and can provide specific notifications to the provider device 108 to guide the user through airport traffic on a granular level (for faster, safer navigation).

As mentioned above, the vehicle-motion-analysis system 104 can generate a driving-event score for a driving event based on vehicle-motion data and vehicle-location data indicating various behaviors. For the driving event illustrated in FIG. 5, for instance, the vehicle-motion-analysis system identifies three vehicle stops, three turns, a pick-up, and a door close. Based on these data, the vehicle-motion-analysis system 104 can determine a driving-event score as described above.

To determine a driving-event score, the vehicle-motion-analysis system 104 can score individual behaviors within the driving event. In particular, the vehicle-motion-analysis system 104 scores a behavior by comparing the behavior with a corresponding model behavior to determine a measure of similarity between them. In addition, the vehicle-motion-analysis system 104 combines individual behavior scores to determine a driving-event score. For example, the vehicle-motion-analysis system 104 determines an average behavior score or a total behavior score. In some embodiments, the vehicle-motion-analysis system 104 weights some behavior scores more heavily than others. Indeed, the vehicle-motion-analysis system 104 can weight scores for stops and turns more heavily than those for accelerations and decelerations (or in some other order) based on a driving-event type (e.g., pick-up versus drop-off) and/or a prioritization set by an administrator.

In some embodiments, the vehicle-motion-analysis system 104 utilizes driving-event scores for particular applications. For example, the vehicle-motion-analysis system 104 utilizes a driving-event score as (or to determine) a probability of an accident occurring for a driving event. As another example, the vehicle-motion-analysis system 104 utilizes a driving-event score as (or to determine) a measure of riskiness for a driving event. Further, the vehicle-motion-analysis system 104 determines location ratings (which may indicate a likelihood of an accident) and provider ratings (which may indicate a measure of riskiness in provider driving behavior) based on driving-event scores.

As mentioned above, the vehicle-motion-analysis system 104 can determine location ratings and provider ratings based on driving-event scores. For example, the vehicle-motion-analysis system 104 can determine a location rating for the location shown in FIG. 5 based on one or more driving-event scores. To elaborate, the vehicle-motion-analysis system 104 can identify multiple trips by the provider device 108 or the transportation vehicle 112 to the same location. Based on the multiple trips, the vehicle-motion-analysis system 104 can determine a combined or a composite location rating by averaging the location ratings for the individual trips.

For example, the vehicle-motion-analysis system 104 can weight certain location ratings (e.g., more recent location ratings or location ratings associated with trips that took place during particular conditions such as bad weather or heavy traffic) differently in the determination of a combined location rating. In one or more embodiments, the vehicle-motion-analysis system 104 weights location ratings from more recent trips more heavily because they are more likely to reflect the current state of the location. In addition, the vehicle-motion-analysis system 104 weights location ratings from trips that occurred during particularly bad weather or unusually heavy traffic less heavily because the uncharacteristically bad conditions indicate that the location rating from that trip is less representative of the location under normal conditions. In some embodiments, the vehicle-motion-analysis system 104 can determine a location-specific provider rating for the location based on the multiple trips as well (e.g., by averaging provider ratings across the multiple trips to the location).

Figure 6B:
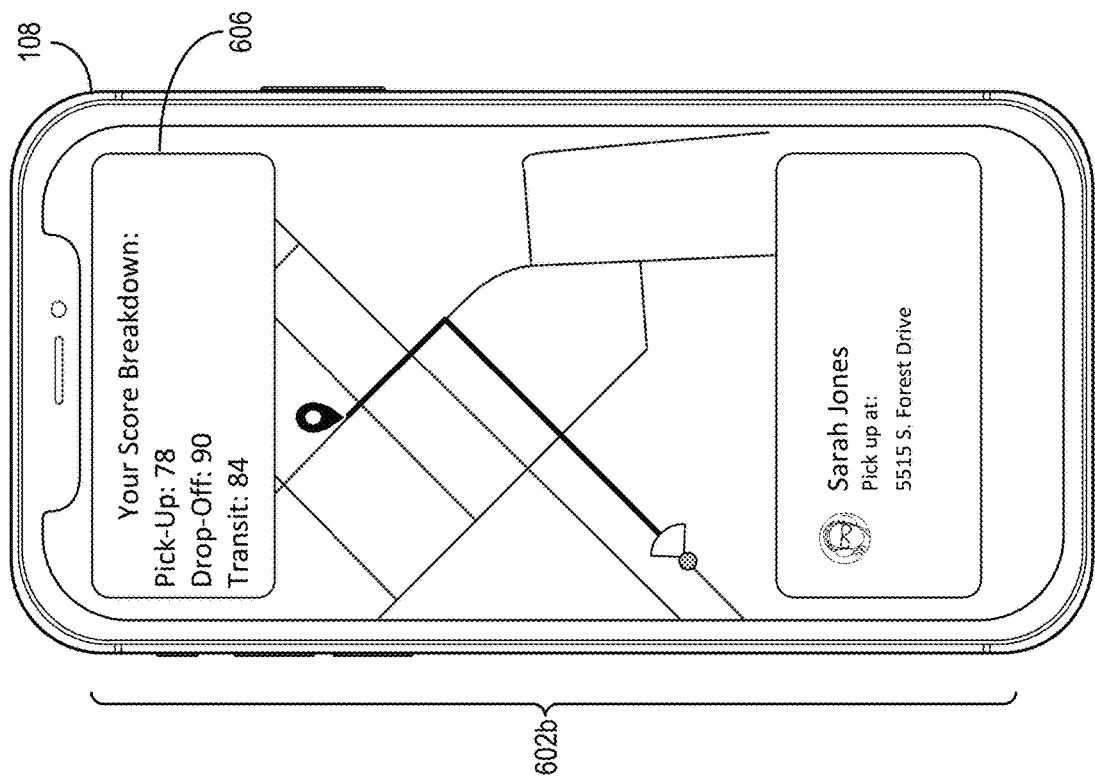
FIGS. 6A-6C illustrate customized graphical user interfaces for a provider device based on driving-event scores in accordance with one or more embodiments.
Figure 6A:
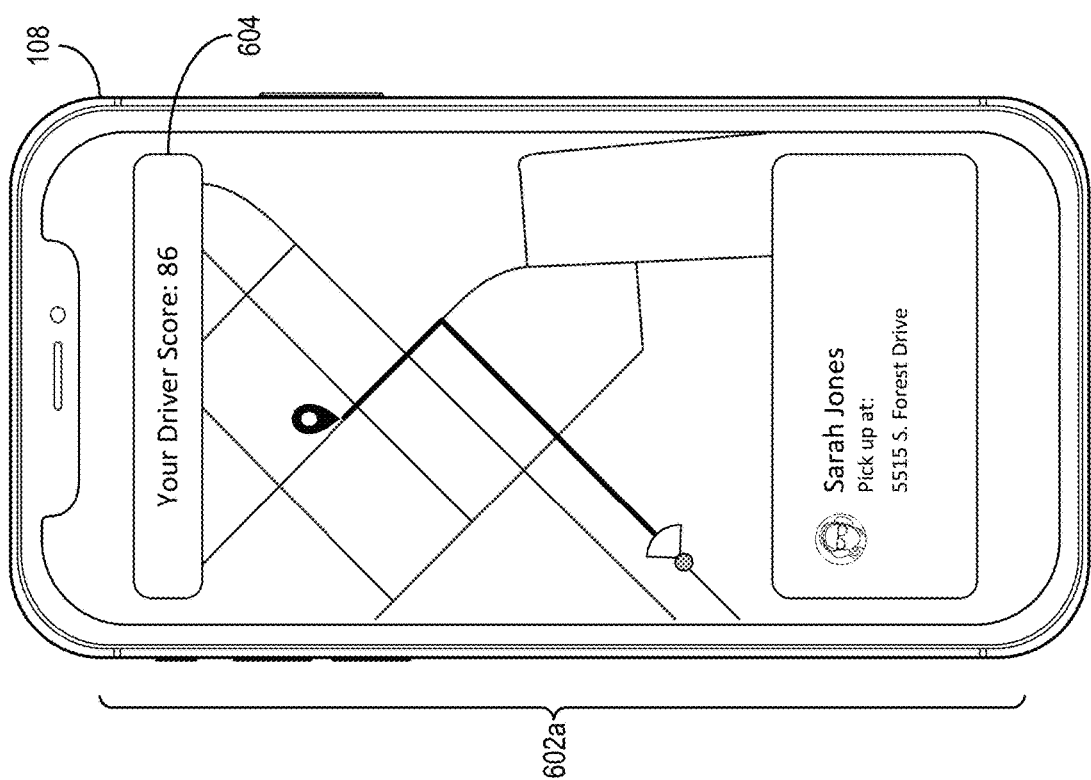
Figure 6C:
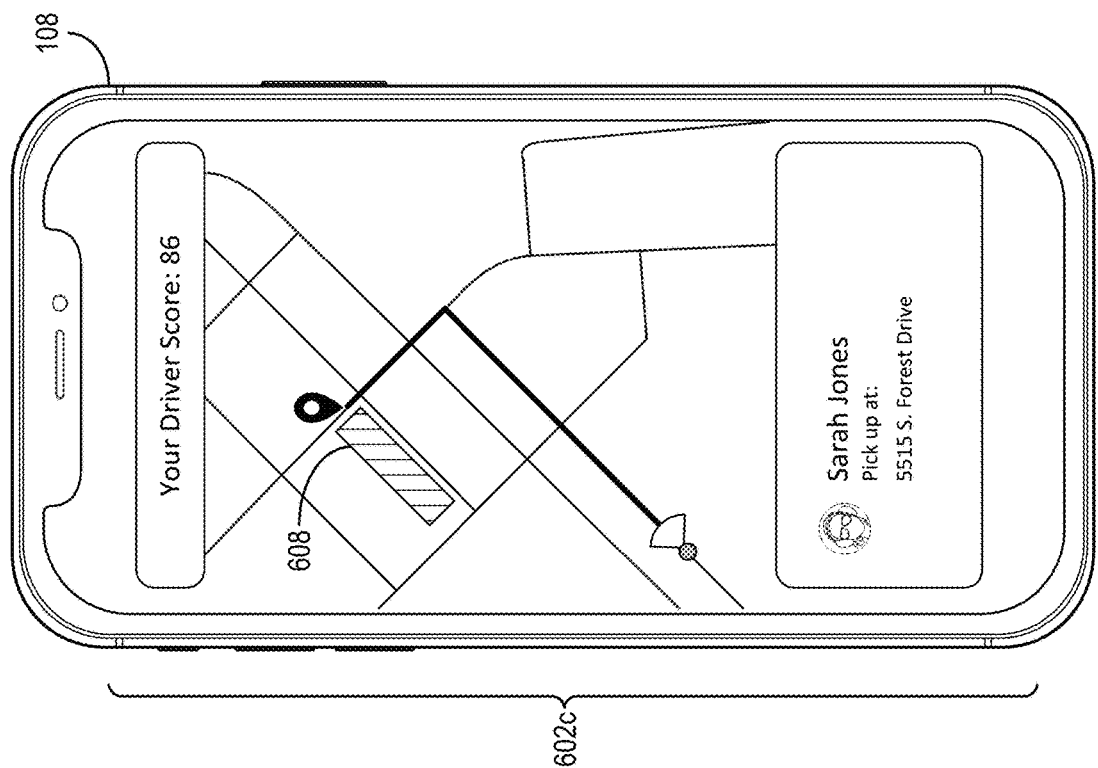
Figure 7:
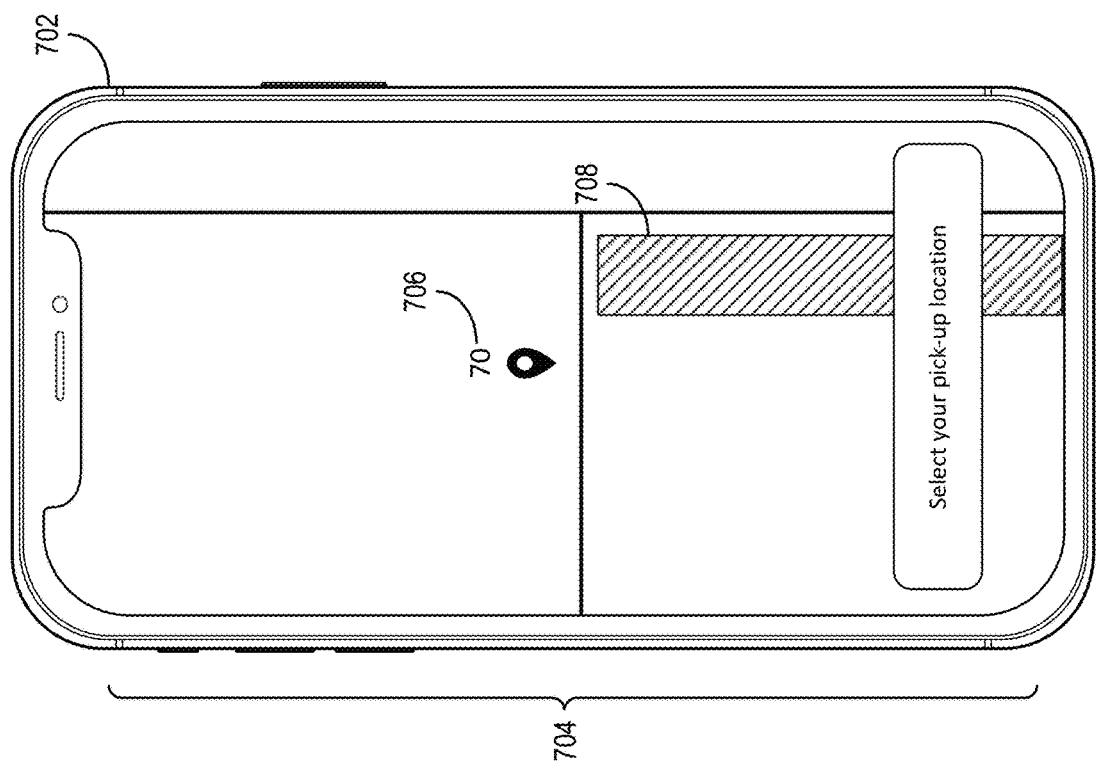
FIG. 7 illustrates a customized graphical user interface for a requester device based on a driving-event score in accordance with one or more embodiments.

As further mentioned above, the vehicle-motion-analysis system 104 can provide a customized graphical user interface based on a driving-event score. In particular, the vehicle-motion-analysis system 104 can generate and provide interface elements for display within a provider graphical user interface or a requester graphical user interface. FIGS. 6A-6C illustrate provider graphical user interfaces displayed on the provider device 108 in accordance with one or more embodiments. Thereafter, FIG. 7 illustrates a requester graphical user interface displayed on a requester device 702 in accordance with one or more embodiments.

As illustrated in FIG. 6A, the provider device 108 displays a provider graphical user interface 602a that includes a driver-rating element 604. Indeed, as described above, the vehicle-motion-analysis system 104 can generate a provider rating based on one or more driving-event scores. For example, in some implementations, the vehicle-motion-analysis system 104 generates a provider rating cumulatively over multiple driving events associated with the provider device 108. Thus, the vehicle-motion-analysis system 104 can provide the driver-rating element 604 representing either a single driving event or multiple driving events for display within the provider graphical user interface 602a.

As illustrated in FIG. 6B, the provider device 108 displays a provider graphical user interface 602b that includes a provider-rating-breakdown element 606. In particular, the vehicle-motion-analysis system 104 determines event-type-specific provider ratings for the provider associated with the provider device 108. For instance, the vehicle-motion-analysis system 104 determines separate average ratings or cumulative ratings for pick-up event scores, drop-off event scores, and transit event scores. As indicated above, in certain embodiments, a transit event score represents a score for driving in between a pickup location and a drop-off location. Thus, in some cases, the vehicle-motion-analysis system 104 provides the provider-rating-breakdown element 606 that includes a breakdown of different event-specific provider ratings for display on the provider device 108.

As illustrated in FIG. 6C, the provider device 108 displays a provider graphical user interface 602c that includes a location-restriction element 608. In particular, the provider device 108 displays the location-restriction element 608 at a position within the provider graphical user interface 602c that corresponds to a location with a low location rating. Indeed, as described above, the vehicle-motion-analysis system 104 determines location ratings for various locations based on driving-event scores. For example, the vehicle-motion-analysis system 104 determines a cumulative rating or an average rating for a location based on multiple driving-event scores corresponding to the location. In some embodiments, the vehicle-motion-analysis system 104 determines event-type-specific location ratings for pick-up events, drop-off events, and transit events.

Based on determining that a location rating is below a rating threshold (e.g., for a particular type of driving event), the vehicle-motion-analysis system 104 determines that the location is unsafe or not viable for that type of driving event. As shown in FIG. 6C, the vehicle-motion-analysis system 104 determines that the location corresponding to the location-restriction element 608 is unsafe. Based on such a determination, the vehicle-motion-analysis system 104 designates the location as forbidden or restricted for a driving event and prevents a pick up, drop off, waypoint stop, or other driving event from occurring at the indicated location. The vehicle-motion-analysis system 104 thus effectively prevents accidents or other dangerous driving patterns from potentially occurring and improves safety over conventional systems.

As mentioned, the vehicle-motion-analysis system 104 can further provide a customized requester graphical user interface for display on a requester device. FIG. 7 illustrates a requester graphical user interface 704 including a location-rating indicator 706 and a location-restriction element 708 in accordance with one or more embodiments. Indeed, the vehicle-motion-analysis system 104 generates the location-rating indicator 706 to represent the location rating corresponding to the indicated location, and the vehicle-motion-analysis system 104 also generate a location-restriction element 708 indicating a forbidden or restricted location that the vehicle-motion-analysis system 104 prevents from being selected as a pick-up location, drop-off location, waypoint, or other location for a request.

As illustrated in FIG. 7, the requester device 702 (e.g., the requester device 116) displays the requester graphical user interface 704 to facilitate a requester selecting a pick-up location for a transportation request. For example, the requester device 702 can detect a requester touching a screen and swipe to slide the displayed map around the fixed location-selection pin to set a pick-up location other than the location marked by the location-restriction element 708. As the requester interacts with the requester device 702 to slide the map around underneath the location-selection pin (e.g., simultaneously with the user input), the vehicle-motion-analysis system 104 continuously updates the location-rating indicator 706 based on location ratings for display within the requester device 702.

For example, the vehicle-motion-analysis system 104 updates the location-rating indicator 706 to indicate location ratings of locations where the pin is pointing on the map. As shown, the location-rating indicator 706 indicates a rating of 70 (e.g., out of 100) for the location of the pin. As the requester slides the map so that the pin points to a different location, however, the vehicle-motion-analysis system 104 updates the location-rating indicator 706 to reflect the location rating of the new location. Based on receiving a score from the vehicle-motion-analysis system 104, the requester device 702 displays the score corresponding to a location selected by the requester. In some embodiments, the location-rating indicator 706 can have a different appearance, such as a particular color (e.g., based on a color gradient where greener colors correspond to higher location ratings, redder colors correspond to lower location ratings, and yellow corresponds to average location ratings).

Figure 8:
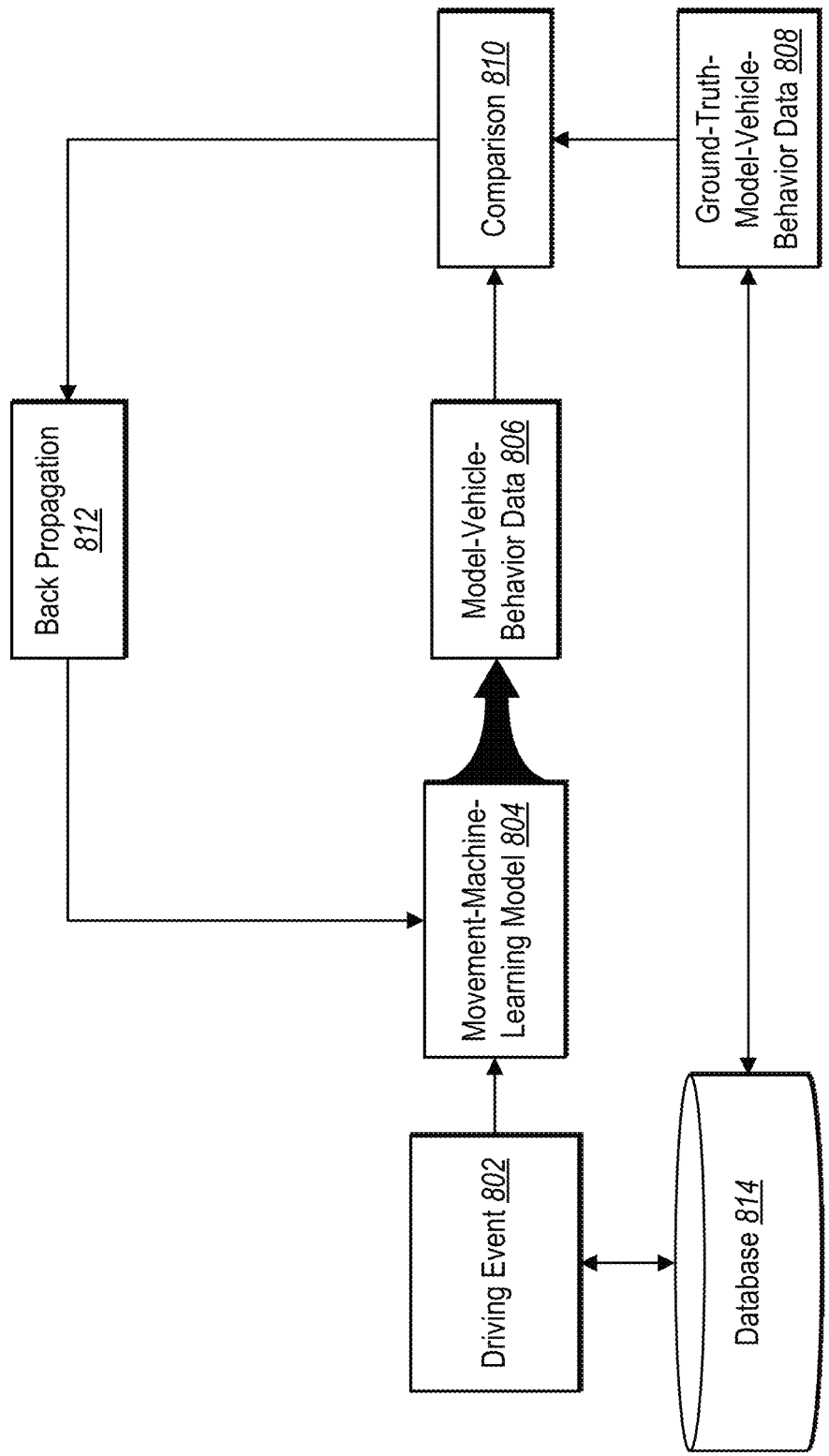
FIG. 8 illustrates training a movement-machine-learning model to generate model location and motion data for a driving event in accordance with one or more embodiments.

As mentioned, the vehicle-motion-analysis system 104 can generate driving-event scores based on comparing particular event-specific driving behavior data with model-vehicle-behavior data. In particular, the vehicle-motion-analysis system 104 can train a movement-machine-learning model to generate model-vehicle-behavior data for particular driving events to use as a baseline for the comparison, such as model-vehicle-location data and model-vehicle-motion data. FIG. 8 illustrates training a movement-machine-learning model 804 to generate model-vehicle-behavior data 806 in accordance with one or more embodiments.

As illustrated in FIG. 8, the vehicle-motion-analysis system 104 identifies a driving event 802 to input into the movement-machine-learning model 804. In particular, the vehicle-motion-analysis system 104 accesses driving event information such as an event location and an event type from a database 814. Based on inputting the event location and the event type (which together define the driving event 802) into the movement-machine-learning model 804, the movement-machine-learning model 804 generates model-vehicle-behavior data 806. More specifically, the movement-machine-learning model 804 analyzes the driving event information utilizing its various neurons, layers, and weights to pass data between layers and ultimately generate an output of model-vehicle-behavior data 806. For example, the model-vehicle-behavior data 806 can include model-vehicle-location data and model-vehicle-motion data corresponding to one or more behaviors (e.g., stops, turns, etc.) that occur during the driving event.

Additionally, the vehicle-motion-analysis system 104 performs a comparison 810 to compare the model-vehicle-behavior data 806 with ground-truth-model-vehicle-behavior data 808 (e.g., ground-truth-vehicle-location data and ground-truth-vehicle-motion data). In particular, the vehicle-motion-analysis system 104 accesses the ground-truth-model-vehicle-behavior data 808 that corresponds to the driving event 802 from the database 814. The ground-truth-model-vehicle-behavior data 808 can include motion data that represents desired or ideal data for one or more behaviors (e.g., a model acceleration, a model deceleration, a model stop location, a model turn location, a model measure of turn harshness, or a model measure of stop harshness). With the comparison 810, the vehicle-motion-analysis system 104 determines how closely the model-vehicle-behavior data 806 resembles the ground-truth-model-vehicle-behavior data 808. For example, the vehicle-motion-analysis system 104 utilizes a loss function such as a cross-entropy loss function or some other type of loss function to determines an error or a measure of loss associated with the movement-machine-learning model 804.

Based on the measure of loss associated with the movement-machine-learning model 804, the vehicle-motion-analysis system 104 further performs a back propagation 812. In particular, the vehicle-motion-analysis system 104 back propagates to adjust or modify various internal weights or parameters of the movement-machine-learning model 804. By modifying the weights, the vehicle-motion-analysis system 104 changes how the movement-machine-learning model 804 analyzes information and passes data between neurons or layers. The vehicle-motion-analysis system 104 modifies the weights to minimize or reduce the measure of loss determined via the comparison 810.

The vehicle-motion-analysis system 104 further repeats the training process illustrated in FIG. 8 for multiple iterations or epochs. For example, the vehicle-motion-analysis system 104 identifies new driving events to input into the movement-machine-learning model 804 as well as corresponding ground-truth-model-vehicle-behavior data to compare with model-vehicle-behavior data that the movement-machine-learning model 804 generates. The vehicle-motion-analysis system 104 further back propagates to modify parameters and improve accuracy by reducing the measure of loss of the movement-machine-learning model 804. Over the training process, the vehicle-motion-analysis system 104 reduces the measure of loss associated with the movement-machine-learning model 804 until converging on model-vehicle-behavior data for a particular driving event. Alternatively, the vehicle-motion-analysis system 104 continues training iterations or training epochs until reducing the measure of loss associated with the movement-machine-learning model 804 until the loss is below a threshold loss (or until the movement-machine-learning model 804 satisfies a threshold accuracy in generating model-vehicle-behavior data).

In some embodiments, the vehicle-motion-analysis system 104 trains the movement-machine-learning model 804 based on different data. For example, the vehicle-motion-analysis system 104 can train the movement-machine-learning model 804 to predict likelihoods or probabilities of accidents occurring at particular locations (or on particular routes at particular times of day based on traffic, weather, and event schedules). Indeed, the motion-analysis system 104 trains the model utilizing training data for historical driving events that consists of, for a given historical driving event, accident information (e.g., an indication of whether or not an accident occurred during the historical driving event), motion information indicating movement of a vehicle/device during the historical driving event, route information, location information, traffic information, weather information, and/or even schedule information. Thus, upon training the movement-machine-learning model 804 for multiple iterations/epochs, the vehicle-motion-analysis system 104 can apply the model to driving event information for a current driving event (e.g., information including location, route, traffic, weather, and/or event schedule) to predict whether or an accident will occur (or to predict a probability of an accident occurring).

Figure 9:
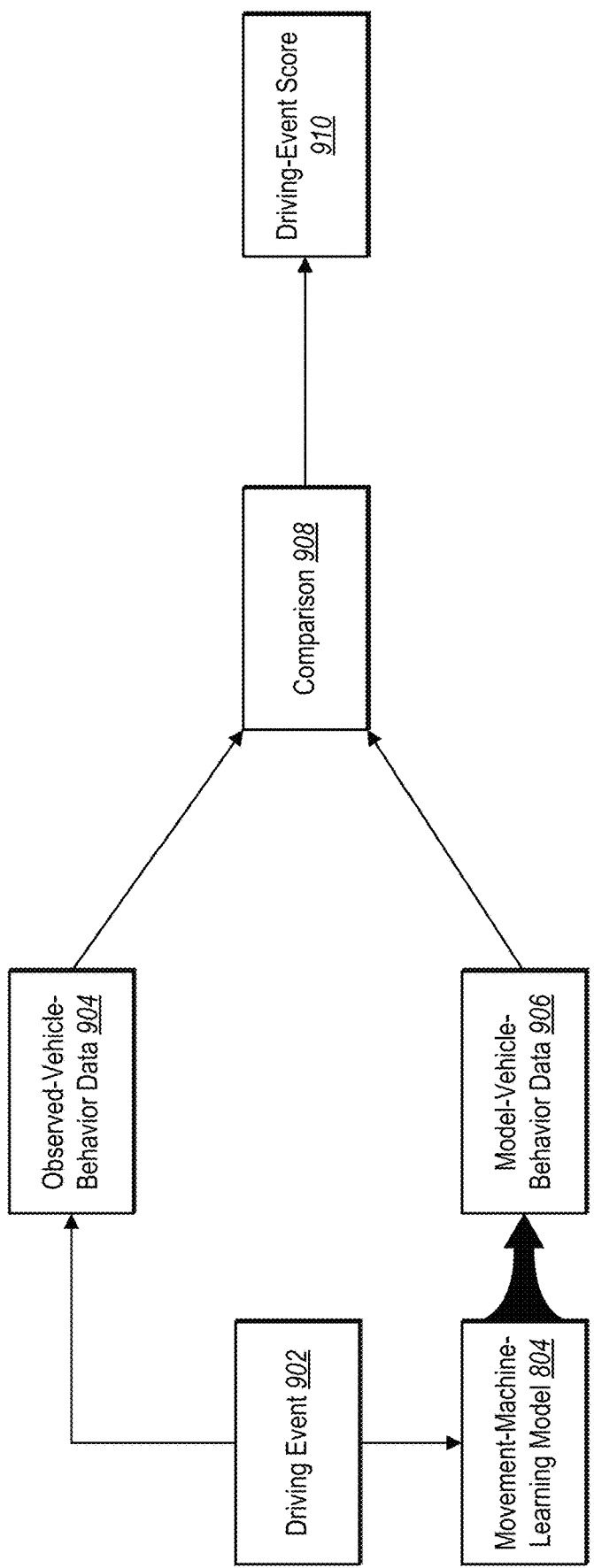
FIG. 9 illustrates comparing model location and motion data with observed location and motion data for a transportation vehicle to determine a driving-event score in accordance with one or more embodiments.

Based on training the movement-machine-learning model 804, the vehicle-motion-analysis system 104 can utilize the movement-machine-learning model 804 to generate model-vehicle-behavior data to use as a basis for determining driving-event scores. FIG. 9 illustrates comparing model-vehicle-behavior data 906 with observed-vehicle-behavior data 904 to generate a driving-event score 910 in accordance with one or more embodiments.

As illustrated in FIG. 9, the vehicle-motion-analysis system 104 identifies a driving event 902 associated with the transportation vehicle 112. Particularly, the vehicle-motion-analysis system 104 identifies a driving-event type and an event location associated with the driving event 902. In some embodiments, the vehicle-motion-analysis system 104 identifies the driving event 902 by detecting one or more event indicators, as described above.

In any event, the vehicle-motion-analysis system 104 determines observed-vehicle-behavior data 904 for the driving event 902. More specifically, the vehicle-motion-analysis system 104 determines vehicle-location data and vehicle-motion data for the transportation vehicle 112 as the transportation vehicle performs one or more behaviors during the driving event 902. For example, the vehicle-motion-analysis system 104 determines how sharp transportation vehicle 112 turns for a given turn or how harsh the transportation vehicle brakes for a given stop.

Additionally, the vehicle-motion-analysis system 104 inputs the driving event 902 (e.g., the event location and the event type) into the movement-machine-learning model 804, whereupon the movement-machine-learning model 804 generates the model-vehicle-behavior data 906. The model-vehicle-behavior data 906 indicates target vehicle-location data and vehicle-motion data for one or more behaviors such as stops, turns, etc., for the driving event 902.

The vehicle-motion-analysis system 104 further performs a comparison 908 to compare the observed-vehicle-behavior data 904 with the model-vehicle-behavior data 906. Indeed, the vehicle-motion-analysis system 104 performs the comparison 908 to determine how similar the observed-vehicle-behavior data 904 is to the model-vehicle-behavior data 906 (e.g., by determining a measure of error).

Based on the comparison 908, the vehicle-motion-analysis system 104 further generates a driving-event score 910. In particular, the vehicle-motion-analysis system 104 generates a driving-event score 910 that indicates the measure of similarity (or error) between the observed-vehicle-behavior data 904 and the model-vehicle-behavior data 906. In some embodiments, the vehicle-motion-analysis system 104 generates the driving-event score 910 in the form of a rating from 1-10 or from 1-100, where higher numbers indicate a higher degree of similarity (or a lower error).

In some embodiments, such as those embodiments where the vehicle-motion-analysis system 104 utilizes the movement-machine-learning model 804 to predict accidents, the vehicle-motion-analysis system 104 determines the driving-event score 910 based on the likelihood of an accident occurring. For example, the vehicle-motion-analysis system 104 applies an inverse relationship to the likelihood of an accident occurring and the driving-event score 910. The vehicle-motion-analysis system 104 thus generates higher driving-event scores for driving events with lower likelihoods of accidents occurring and generates lower driving-event scores for driving events with higher likelihoods of accidents occurring.

In addition to determining the driving-event score 910, the vehicle-motion-analysis system 104 can further utilize the trained movement-machine-learning model 804 for other applications as well. For example, the vehicle-motion-analysis system 104 can utilize mode-vehicle-behavior data 906 and/or accident prediction data to determine how an autonomous vehicle should move for various driving events. Indeed, the vehicle-motion-analysis system 104 can train or coach an autonomous vehicle to performs particular motions during a driving event for better driving-event scores and to avoid accidents. For instance, the vehicle-motion-analysis system 104 can train an autonomous vehicle on how to change lanes during a driving event, how to pull up to an airport pick-up location, how to cross a bus line during a driving event, how to cross a bike lane during a driving event, or how to perform a u-turn during a driving event.

Figure 10:
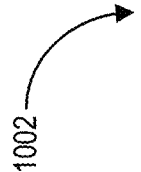
FIGS. 10-12 illustrate accuracy metrics of transportation-vehicle-motion data determined by the vehicle-motion-analysis system in accordance with one or more embodiments.
Figure 11:
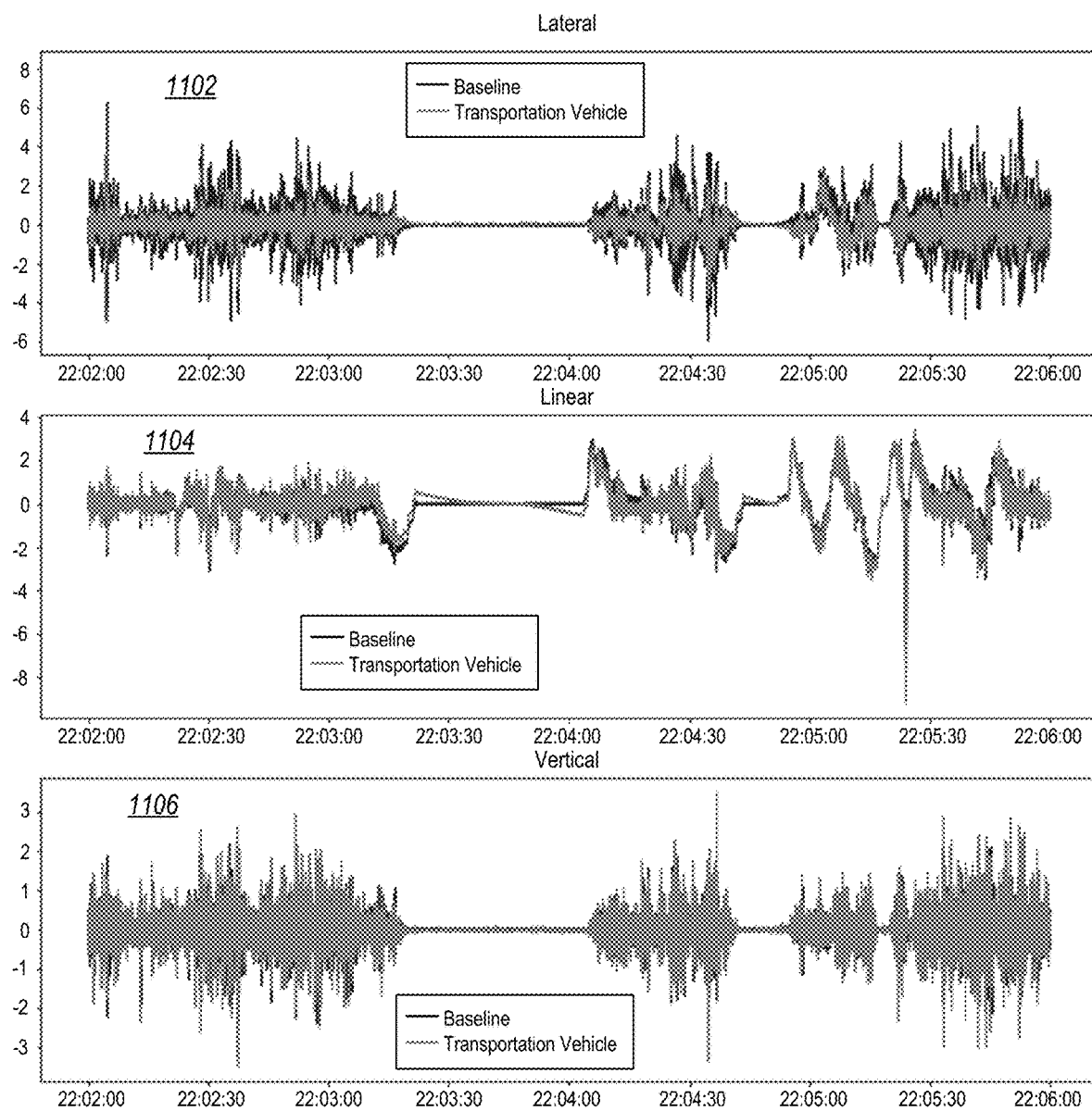
Figure 12:
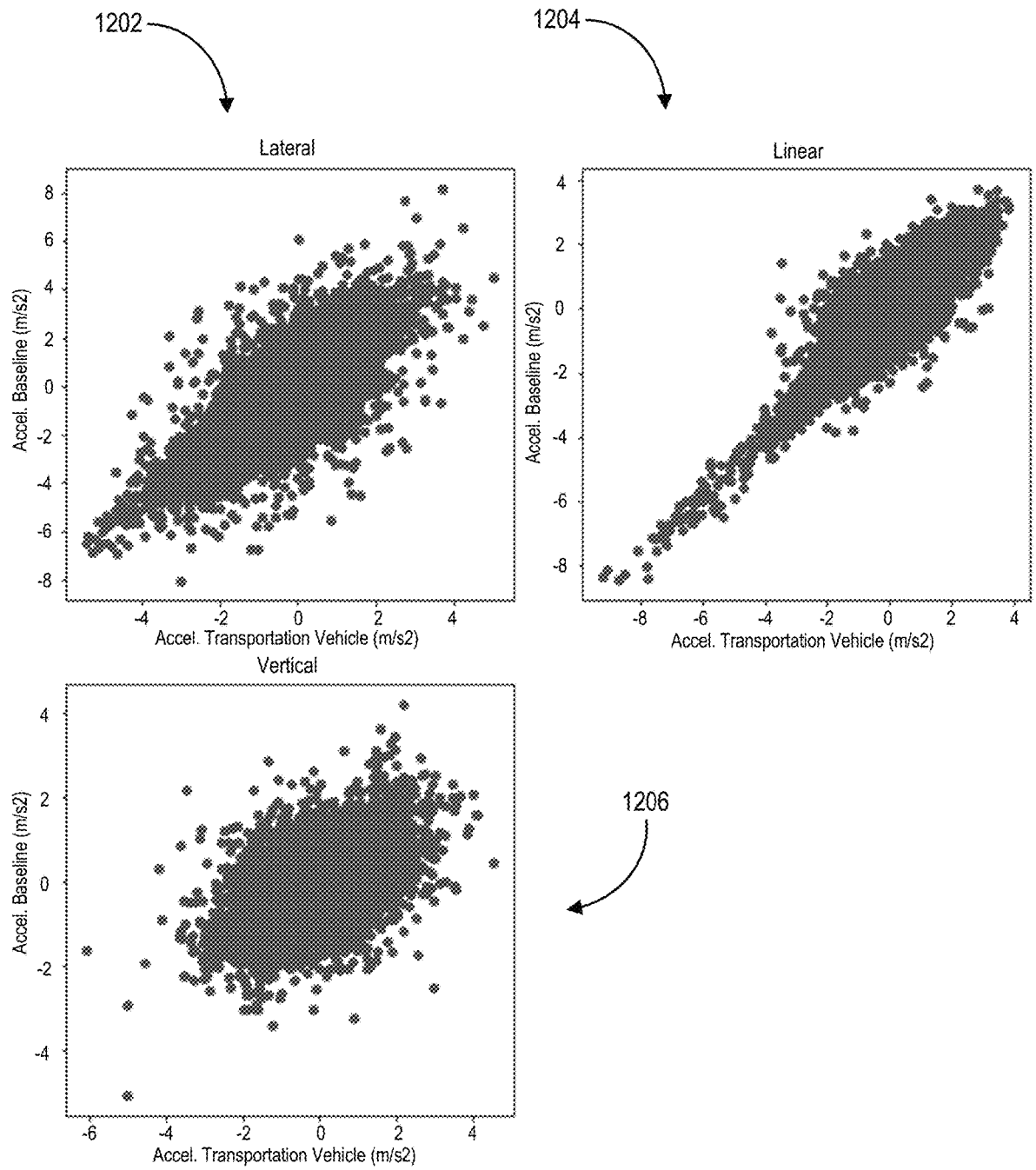

As mentioned above, the vehicle-motion-analysis system 104 accurately determines location information for a transportation vehicle. Indeed, experimenters have demonstrated the accuracy of the vehicle-motion-analysis system 104. FIGS. 10-12 illustrate the accuracy of the vehicle-motion-analysis system 104 in accordance with one or more embodiments. For example, FIG. 10 illustrates a table 1002 of different accuracy metrics (e.g., errors) in accordance with one or more embodiments.

As shown in FIG. 10, the table 1002 includes three different accuracy metrics-a mean error, a standard error, and a Pearson Correlation. Additionally, the table 1002 indicates the three different accuracy metrics for three different accelerations-lateral, linear, and vertical. To determine the accuracy metrics, the vehicle-motion-analysis system 104 compares vehicle-motion data with baseline motion data.

For example, the vehicle-motion-analysis system 104 determines vehicle-motion data as described above by applying axes-rotation parameters to provider-device motion data. In addition, the vehicle-motion-analysis system 104 determines baseline motion data by monitoring one or more transportation vehicles equipped with sensors such as IMUs, accelerometers, and gyroscopes. For example, the vehicle-motion-analysis system 104 determines baseline motion data from an autonomous vehicle traveling a particular route, where the vehicle-motion-analysis system 104 receives motion data from the autonomous vehicle during the route.

The vehicle-motion-analysis system 104 thus compares the baseline motion data with the vehicle-motion data to determine the accuracy metrics of the table 1002. As shown in the table 1002, the vehicle-motion-analysis system 104 exhibits a high degree of accuracy. For instance, the Pearson Correlations are relatively high, while the mean errors are low.

Experimenters have modeled the accuracy of the vehicle-motion-analysis system 104 as well. Indeed, FIGS. 11-12 illustrate different visual representations of the accuracy metrics from the table 1002 in accordance with one or more embodiments. As illustrated in FIG. 11, the graph 1102 illustrates a comparison of lateral acceleration of vehicle-motion data and baseline motion data. Similarly, the graph 1104 illustrates a comparison of linear acceleration and baseline motion data, and the graph 1106 illustrates a comparison of vertical acceleration and baseline motion data.

Within the graphs 1102-1106, the darker shading represents baseline motion data while the lighter shading represents vehicle-motion data. As shown in the graphs 1102-1106, there is some measure of error or difference between the baseline motion data and the vehicle-motion data. However, the vehicle-motion data nevertheless closely resembles the baseline motion data.

FIG. 12 illustrates a different representation of comparing vehicle-motion data with baseline motion data. For example, FIG. 12 illustrates scatterplots 1202-1206 that include points for discrete data points indicating relationships between to vehicle-motion data and baseline motion data. The scatterplot 1202 represents lateral acceleration, while the scatterplot 1204 represents linear acceleration, and the scatterplot 1206 represents vertical acceleration.

Within the scatterplots 1202-1206, if the data points aligned in a straight line (e.g., with a slope of 1), there would be 100% correlation between the motion data. As illustrated, the data points are well-grouped and generally follow the trend of a straight line (e.g., with a slope of 1). Therefore, the vehicle-motion-analysis system 104 exhibits a high degree of accuracy in determining vehicle-motion data using the techniques described herein.

Figure 13:
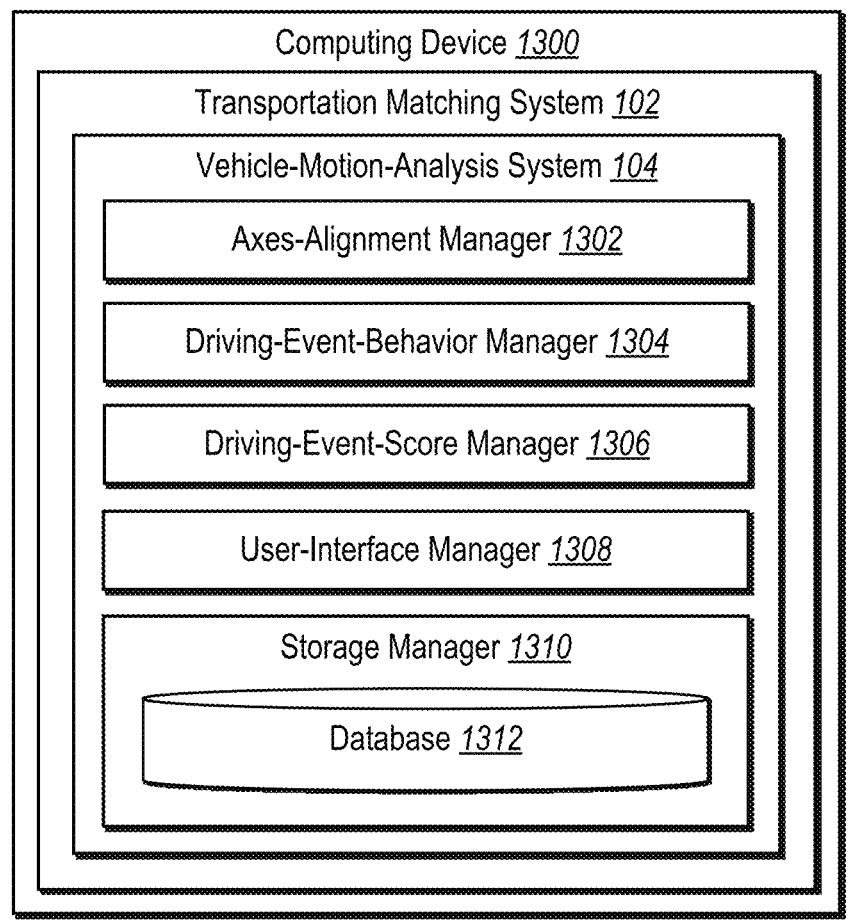
FIG. 13 illustrates a block diagram of an example computing device including various components of a vehicle-motion-analysis system in accordance with one or more embodiments.

Looking now to FIG. 13, additional detail will be provided regarding components and capabilities of the vehicle-motion-analysis system 104. Specifically, FIG. 13 illustrates an example schematic diagram of the vehicle-motion-analysis system 104 on an example computing device 1300 (e.g., one or more of the provider device 108 and/or the server(s) 106). As shown in FIG. 13, the vehicle-motion-analysis system 104 may include an axes-alignment manager 1302, a driving-event-behavior manager 1304, a driving-event-score manager 1306, a user-interface manager 1308, and a storage manager 1310.

As mentioned, the vehicle-motion-analysis system 104 includes an axes-alignment manager 1302. In particular, the axes-alignment manager 1302 can manage, determine, detect, generate, obtain, or otherwise identify aligned provider-device axes with transportation-vehicle axes. For example, the axes-alignment manager 1302 can align provider-device axes with transportation-vehicle axes (or vice-versa) by determining axes-rotation parameters. Indeed, the axes-alignment manager 1302 can communicate with a provider device or the storage manager 1310 to access provider-device location data and provider-device motion data (e.g., from the database 1312). Based on these data, the axes-alignment manager 1302 can determine vehicle-location data and vehicle-motion data, as described herein. The axes-alignment manager 1302 can further communicate with the driving-event-behavior manager 1304 to provide the vehicle-location data and vehicle-motion data and/or with storage manager 1310 to store the vehicle-location data and the vehicle-motion data within the database 1312.

As also mentioned, the vehicle-motion-analysis system 104 includes a driving-event-behavior manager 1304. In particular, the driving-event-behavior manager 1304 can manage, determine, detect, monitor, obtain, or otherwise identify driving-event behavior associated with a transportation vehicle. For example, the driving-event-behavior manager 1304 can determine stops, turns, and other behavior that the transportation vehicle performs based on the vehicle-location data and the vehicle-motion data. The driving-event-behavior manager 1304 can further communicate with the storage manager 1310 to store behavior data within the database 1312 and/or can communicate with the driving-event-score manager 1306 to provide the behavior data.

As illustrated, the vehicle-motion-analysis system 104 includes a driving-event-score manager 1306. In particular, the driving-event-score manager 1306 can manage, maintain, determine, obtain, generate, extrapolate, or otherwise identify driving-event scores based on vehicle-location data and vehicle-motion data for various behaviors of a driving event. In addition, the driving-event-score manager 1306 can generate location ratings and/or provider ratings based on driving-event scores. The driving-event-score manager 1306 can further communicate with the user-interface manager 1308 to provide the driving-event scores (or the location ratings or the provider ratings) and/or can communicate with the storage manager 1310 to store the driving-event scores (or the location ratings or the provider ratings) within the database 1312.

The vehicle-motion-analysis system 104 further includes a user-interface manager 1308. In particular, the user-interface manager 1308 can manage, maintain, generate, provide, present, display, customize, or otherwise portray user interface elements within a graphical user interface. For example, the user-interface manager 1308 can generate and provide a driver-rating element and/or a location-restriction element based on driver ratings or provider ratings. In some embodiments, the user-interface manager 1308 can communicate with a provider device (e.g., the provider device 108) to provide data for a customized graphical user interface.

In one or more embodiments, each of the components of the vehicle-motion-analysis system 104 are in communication with one another using any suitable communication technologies. Additionally, the components of the vehicle-motion-analysis system 104 can be in communication with one or more other devices including one or more client devices described above. It will be recognized that although the components of the vehicle-motion-analysis system 104 are shown to be separate in FIG. 13, any of the subcomponents may be combined into fewer components, such as into a single component, or divided into more components as may serve a particular implementation. Furthermore, although the components of FIG. 13 are described in connection with the vehicle-motion-analysis system 104, at least some of the components for performing operations in conjunction with the vehicle-motion-analysis system 104 described herein may be implemented on other devices within the environment.

The components of the vehicle-motion-analysis system 104 can include software, hardware, or both. For example, the components of the vehicle-motion-analysis system 104 can include one or more instructions stored on a computer-readable storage medium and executable by processors of one or more computing devices (e.g., the computing device 1300). When executed by the one or more processors, the computer-executable instructions of the vehicle-motion-analysis system 104 can cause the computing device 1300 to perform the methods described herein. Alternatively, the components of the vehicle-motion-analysis system 104 can comprise hardware, such as a special purpose processing device to perform a certain function or group of functions. Additionally or alternatively, the components of the vehicle-motion-analysis system 104 can include a combination of computer-executable instructions and hardware.

Furthermore, the components of the vehicle-motion-analysis system 104 performing the functions described herein may, for example, be implemented as part of a stand-alone application, as a module of an application, as a plug-in for applications including content management applications, as a library function or functions that may be called by other applications, and/or as a cloud-computing model. Thus, the components of the vehicle-motion-analysis system 104 may be implemented as part of a stand-alone application on a personal computing device or a mobile device. Alternatively or additionally, the components of the vehicle-motion-analysis system 104 may be implemented in any application that allows creation and delivery of marketing content to users, including, but not limited to, various applications.

FIGS. 1-13, the corresponding text, and the examples provide a number of different systems, methods, and non-transitory computer readable media for customizing a graphical user interface based on determining driving-event scores by determining parameters that align provider-device axes with transportation-vehicle axes and applying the parameters to location and motion data for a driving event. In addition to the foregoing, embodiments can also be described in terms of flowcharts comprising acts for accomplishing a particular result. For example, FIG. 14 illustrates a flowchart of an example sequence of acts in accordance with one or more embodiments.

Figure 14:
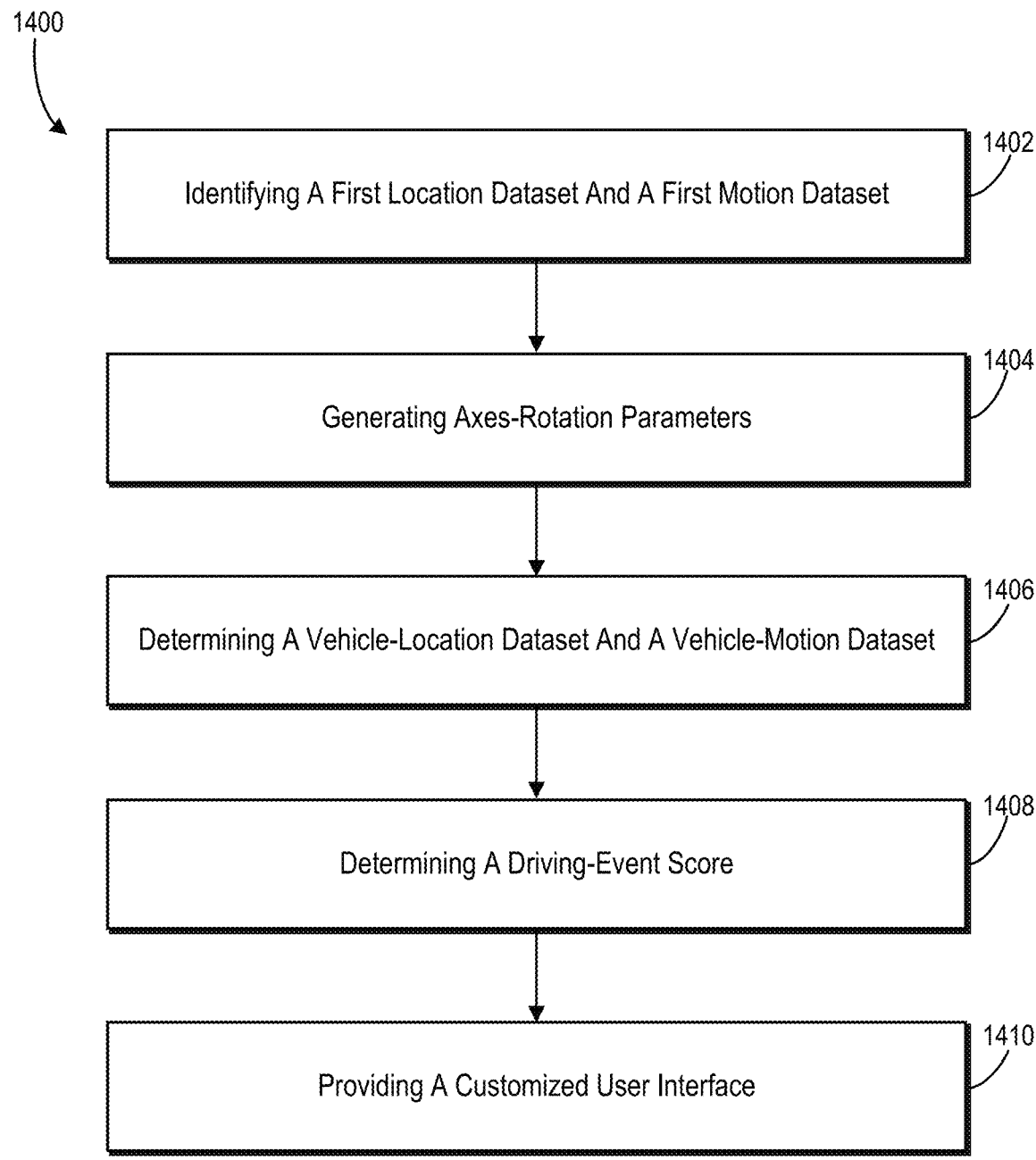
FIG. 14 illustrates an example flow of acts for determining a driving-event score by determining parameters that align provider-device axes with transportation-vehicle axes and applying the parameters to location and motion data for a driving event in accordance with one or more embodiments.

While FIG. 14 illustrates acts according to some embodiments, alternative embodiments may omit, add to, reorder, and/or modify any of the acts shown in FIG. 14. The acts of FIG. 14 can be performed as part of a method. Alternatively, a non-transitory computer readable medium can comprise instructions, that when executed by one or more processors, cause a computing device to perform the acts of FIG. 14. In still further embodiments, a system can perform the acts of FIG. 14. Additionally, the acts described herein may be repeated or performed in parallel with one another or in parallel with different instances of the same or other similar acts.

FIG. 14 illustrates an example series of acts 1400 for customizing a graphical user interface based on determining driving-event scores by determining parameters that align provider-device axes with transportation-vehicle axes and applying the parameters to location and motion data for a driving event. The series of acts 1400 can include an act 1402 of identifying a first location dataset and a first motion dataset. In particular, the act 1402 can involve identifying a first location dataset and a first motion dataset from a provider device corresponding to a transportation vehicle.

As shown, the series of acts 1400 can also include an act 1404 of generating axes-rotation parameters. In particular, the act 1404 can involve generating axes-rotation parameters for aligning provider-device axes for the provider device with vehicle axes for the transportation vehicle based on the first location dataset and the first motion dataset. The act 1404 can involve determining a lateral-target acceleration, a linear-target acceleration, and a vertical-target acceleration for the transportation vehicle based on the first location dataset and the first motion dataset. The act 1404 can also involve identifying a lateral-device acceleration, a linear-device acceleration, and a vertical-device acceleration for the provider device based on the first location dataset and the first motion dataset. Further, the act 1406 can involve generating the axes-rotation parameters by comparing the lateral-target acceleration with the lateral-device acceleration, the linear-target acceleration with the linear-device acceleration, and the vertical-target acceleration with the vertical-device acceleration.

The series of acts 1400 can additionally include an act 1406 of determining a vehicle-location dataset and a vehicle-motion dataset. In particular, the act 1406 can involve determining a vehicle-location dataset and a vehicle-motion dataset corresponding to a driving event of the transportation vehicle by applying the axes-rotation parameters to a second location dataset and a second motion dataset from the provider device. In some embodiments, the vehicle-location dataset and the vehicle-motion dataset corresponding to the driving event indicate a series of movements performed by the transportation vehicle to pick up or drop off a requester at a location.

Further, the series of acts 1400 can include an act 1408 of determining a driving-event score. In particular, the act 1408 can involve determining a driving-event score for the driving event based on the vehicle-location dataset and the vehicle-motion dataset. The act 1408 can involve identifying, based on the second location dataset, a set of location coordinates for the transportation vehicle based on one or more event indicators. The act 1408 can also involve identifying a set of location coordinates for the transportation vehicle between a start time of the driving event and an end time of the driving event. In addition, the act 1408 can involve determining one or more stop locations for the transportation vehicle between the start time and the end time based on groupings of the set of location coordinates (e.g., by determining, for a given stop location of the one or more stop locations, a composite location coordinate based on a group of location coordinates from among the plurality of location coordinates). Further, the act 1408 can involve determining one or more angle changes of the transportation vehicle based on changes in orientation of the provider device between the start time and the end time. The act 1408 can also involve determining one or more acceleration changes of the transportation vehicle identified from the second motion dataset between the start time and the end time. The act 1408 can further involve generating the driving-event score based on the one or more stop locations, the one or more angle changes for the transportation vehicle, and the one or more acceleration changes of the transportation vehicle.

As shown, the series of acts 1400 can include an act 1410 of providing a customized user interface. In particular, the act 1410 can involve providing, for display by the provider device, a customized provider graphical user interface based on the driving-event score. In some embodiments, the act 1410 can involve determining a provider rating for a provider associated with the provider device based on the driving-event score by, based on determining the location rating, providing a location-restriction element for display at a position within the provider graphical user interface that corresponds to the location associated with the driving event, and/or based on determining the provider rating, providing the provider rating for display within the provider graphical user interface.

The series of acts 1400 can also include an act of determining that the first motion dataset for the provider device is translatable to motion associated with the transportation vehicle by determining that the provider device is attached to a mount affixed to the transportation vehicle. For example, the series of acts 1400 can include an act of detecting one or more of a wireless network connection between the provider device and a device mount for the transportation vehicle or a closed circuit between the provider device and the device mount. In addition, the series of acts 1400 can include an act of determining that the provider device is attached to the device mount affixed to the transportation vehicle based on the one or more of the wireless network connection or the closed circuit and an act of, based on determining the provider device is attached to the device mount, generating the axes-rotation parameters.

In some embodiments, the series of acts 1400 includes an act of determining that the provider device is not connected to a device mount for the transportation vehicle and an act of, based on determining that the provider device is not connected to the device mount, providing a notification for display on the provider device indicating that the provider device is not connected to the device mount. The series of acts 1400 can also include an act of determining a location rating for a location associated with the driving event based on the driving-event score and/or an act of determining a provider rating for a provider associated with the provider device based on the driving-event score.

In some embodiments, the series of acts 1400 can include an act of determining, utilizing a movement-machine-learning model, model-vehicle-location data and model-vehicle-motion data at a location corresponding to the driving event. In these or other embodiments, the series of acts 1400 can include an act of determining the driving-event score by comparing the model-vehicle-location data and the model-vehicle-motion data corresponding to the driving event with the vehicle-location dataset and the vehicle-motion dataset of the transportation vehicle. The series of acts 1400 can also include an act of identifying a device rotation of the provider device around the vertical axis based on the gyroscope data. Further, the series of acts 1400 can include an act of generating the axes-rotation parameters by further comparing the target rotation of the transportation vehicle with the device rotation of the provider device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
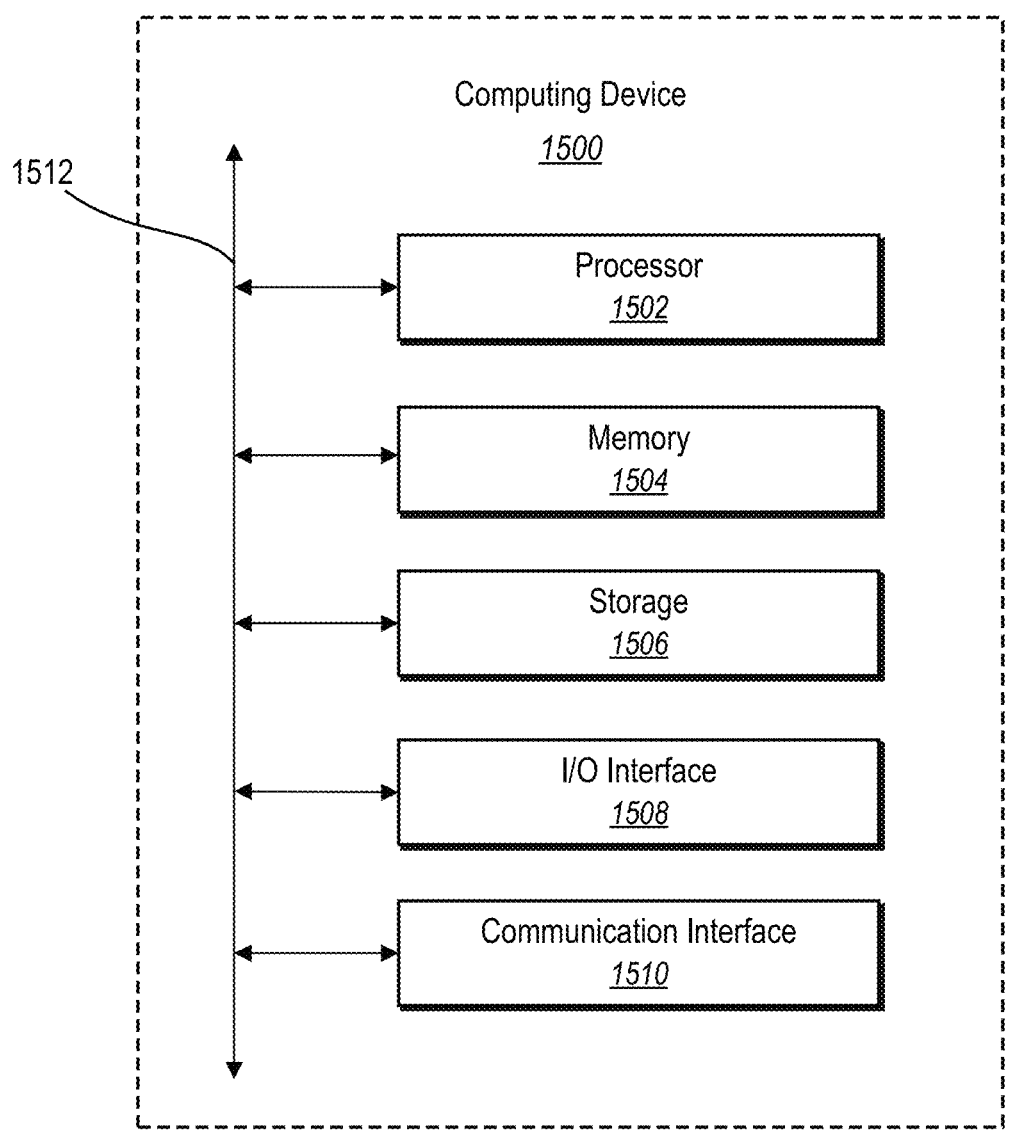
FIG. 15 illustrates a block diagram of a computing device for implementing one or more embodiments of the present disclosure.

FIG. 15 illustrates, in block diagram form, an exemplary computing device 1500 (e.g., the computing device 1300) that may be configured to perform one or more of the processes described above. One will appreciate that the vehicle-motion-analysis system 104 can comprise implementations of the computing device 1500, including, but not limited to, the provider device 108 and/or the server(s) 106. As shown by FIG. 15, the computing device can comprise a processor 1502, memory 1504, a storage device 1506, an I/O interface 1508, and a communication interface 1510. In certain embodiments, the computing device 1500 can include fewer or more components than those shown in FIG. 15. Components of computing device 1500 shown in FIG. 15 will now be described in additional detail.

In particular embodiments, processor(s) 1502 includes hardware for executing instructions, such as those making up a computer program. As an example, and not by way of limitation, to execute instructions, processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, storage device 1506 can comprise a non-transitory storage medium described above. The storage device 1506 may include a hard disk drive ("HDD"), flash memory, a Universal Serial Bus ("USB") drive or a combination of these or other storage devices.

The computing device 1500 also includes one or more input or output interface 1508 (or "I/O interface 1508"), which are provided to allow a user (e.g., requester or provider) to provide input to (such as user strokes), receive output from, and otherwise transfer data to and from the computing device 1500. These I/O interface 1508 may include a mouse, keypad or a keyboard, a touch screen, camera, optical scanner, network interface, modem, other known I/O devices or a combination of such I/O interface 1508. The touch screen may be activated with a stylus or a finger.

The I/O interface 1508 may include one or more devices for presenting output to a user, including, but not limited to, a graphics engine, a display (e.g., a display screen), one or more output providers (e.g., display providers), one or more audio speakers, and one or more audio providers. In certain embodiments, interface 1508 is configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 can provide one or more interfaces for communication (such as, for example, packet-based communication) between the computing device and one or more other computing devices 1500 or one or more networks. As an example, and not by way of limitation, communication interface 1510 may include a network interface controller ("NIC") or network adapter for communicating with an Ethernet or other wire-based network or a wireless NIC ("WNIC") or wireless adapter for communicating with a wireless network, such as a WI-FI. The computing device 1500 can further include a bus 1512. The bus 1512 can comprise hardware, software, or both that connects components of computing device 1500 to each other.

Figure 16:
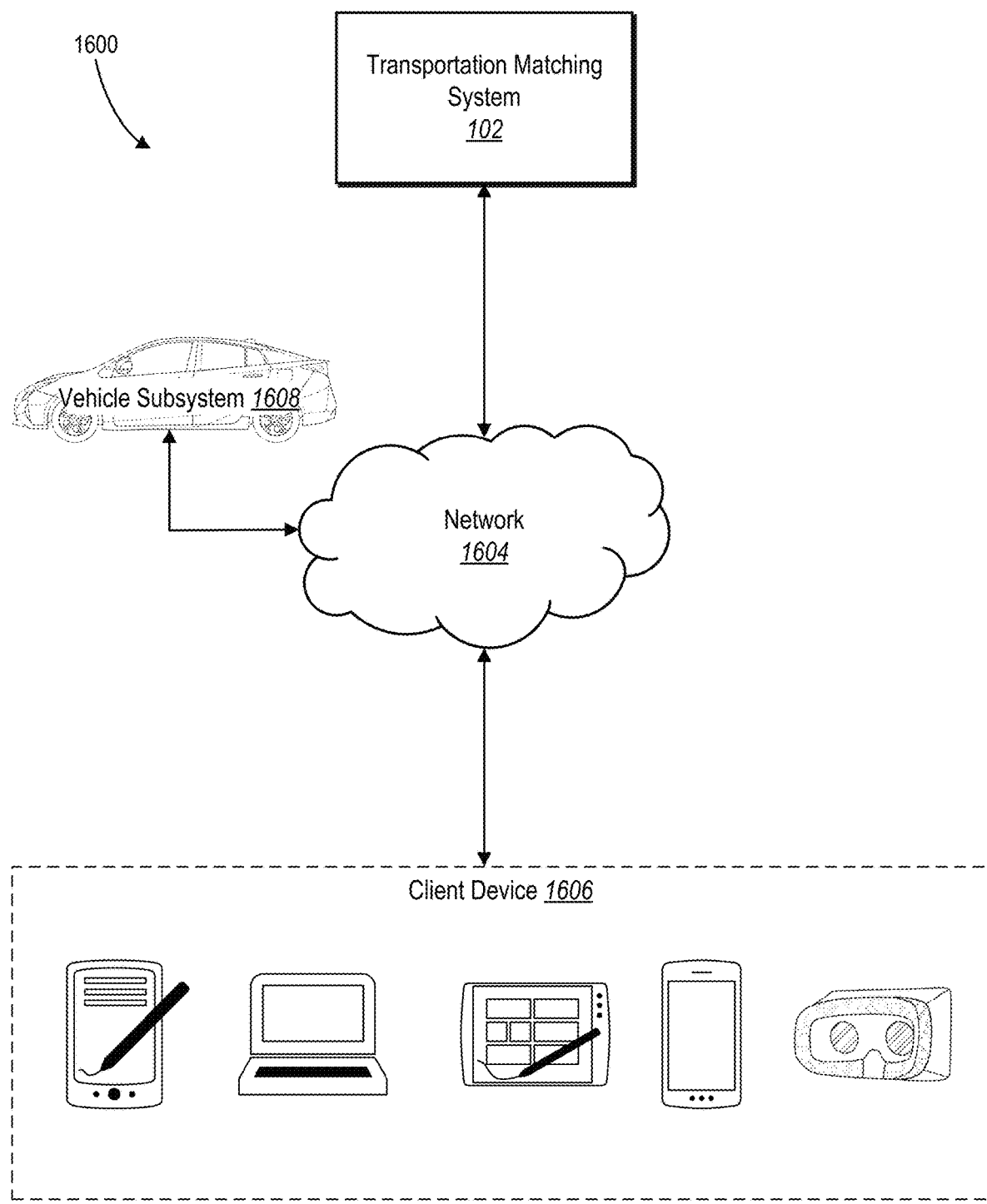
FIG. 16 illustrates an example environment for a transportation matching system in accordance with one or more embodiments.

FIG. 16 illustrates an example network environment 1600 of the transportation matching system 102. The network environment 1600 includes a client device 1606 (e.g., the provider device 108 or the requester device 116), a transportation matching system 102, and a vehicle subsystem 1608 connected to each other by a network 1604. Although FIG. 16 illustrates a particular arrangement of the client device 1606, the transportation matching system 102, the vehicle subsystem 1608, and the network 1604, this disclosure contemplates any suitable arrangement of client device 1606, the transportation matching system 102, the vehicle subsystem 1608, and the network 1604. As an example, and not by way of limitation, two or more of client device 1606, the transportation matching system 102, and the vehicle subsystem 1608 communicate directly, bypassing network 1604. As another example, two or more of client device

1606, the transportation matching system 102, and the vehicle subsystem 1608 may be physically or logically co-located with each other in whole or in part.

Moreover, although FIG. 16 illustrates a particular number of client devices 1606, transportation matching systems 102, vehicle subsystems 1608, and networks 1604, this disclosure contemplates any suitable number of client devices 1606, transportation matching system 102, vehicle subsystems 1608, and networks 1604. As an example, and not by way of limitation, network environment 1600 may include multiple client device 1606, transportation matching system 102, vehicle subsystems 1608, and/or networks 1604.

This disclosure contemplates any suitable network 1604. As an example, and not by way of limitation, one or more portions of network 1604 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1604 may include one or more networks 1604.

Links may connect client device 1606, vehicle-motion-analysis system 104, and vehicle subsystem 1608 to network 1604 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1600. One or more first links may differ in one or more respects from one or more second links.

In particular embodiments, the client device 1606 may be an electronic device including hardware, software, or embedded logic components or a combination of two or more such components and capable of carrying out the appropriate functionalities implemented or supported by client device 1606. As an example, and not by way of limitation, a client device 1606 may include any of the computing devices discussed above in relation to FIG. 15. A client device 1606 may enable a network user at the client device 1606 to access network 1604. A client device 1606 may enable its user to communicate with other users at other client devices 1606.

In particular embodiments, the client device 1606 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1606 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1606 one or more Hyper Text Markup Language ("HTML") files responsive to the HTTP request. The client device 1606 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 102 may be a network-addressable computing system that can host a transportation matching network. The transportation matching system 102 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the transportation matching system 102. In addition, the transportation matching system 102 may manage identities of service requesters such as users/requesters. In particular, the transportation matching system 102 may maintain requester data such as driving/riding histories, personal data, or other user data in addition to navigation and/or traffic management services or other location services (e.g., GPS services).

In particular embodiments, the transportation matching system 102 may manage transportation matching services to connect a user/requester with a vehicle and/or provider. By managing the transportation matching services, the transportation matching system 102 can manage the distribution and allocation of resources from vehicle systems and user resources such as GPS location and availability indicators, as described herein.

The transportation matching system 102 may be accessed by the other components of network environment 1600 either directly or via network 1604. In particular embodiments, the transportation matching system 102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1606, or a transportation matching system 102 to manage, retrieve, modify, add, or delete, the information stored in data store.

In particular embodiments, the transportation matching system 102 may provide users with the ability to take actions on various types of items or objects, supported by the transportation matching system 102. As an example, and not by way of limitation, the items and objects may include transportation matching networks to which users of the transportation matching system 102 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 102 or by an external system of a third-party system, which is separate from transportation matching system 102 and coupled to the transportation matching system 102 via a network 1604.

In particular embodiments, the transportation matching system 102 may be capable of linking a variety of entities. As an example, and not by way of limitation, the transportation matching system 102 may enable users to interact with each other or other entities, or to allow users to interact with these entities through an application programming interfaces ("API") or other communication channels.

In particular embodiments, the transportation matching system 102 may include a variety of servers, sub-systems, programs, modules, logs, and data stores. In particular embodiments, the transportation matching system 102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile or requester profile) store, connection store, third-party content store, or location store. The transportation matching system 102 may also include suitable components such as network interfaces, security mechanisms, load balancers, failover servers, management-and-network-operations consoles, other suitable components, or any suitable combination thereof. In particular embodiments, the transportation matching system 102 may include one or more user-profile stores for storing user profiles for transportation providers and/or transportation requesters. A user profile may include, for example, biographic information, demographic information, behavioral information, social information, or other types of descriptive information, such as interests, affinities, or location.

The web server may include a mail server or other messaging functionality for receiving and routing messages between the transportation matching system 102 and one or more client devices 1606. An action logger may be used to receive communications from a web server about a user's actions on or off the transportation matching system 102. In conjunction with the action log, a third-party-content-object log may be maintained of user exposures to third-party-content objects. A notification controller may provide information regarding content objects to a client device 1606. Information may be pushed to a client device 1606 as notifications, or information may be pulled from client device 1606 responsive to a request received from client device 1606. Authorization servers may be used to enforce one or more privacy settings of the users of the transportation matching system 102. A privacy setting of a user determines how particular information associated with a user can be shared. The authorization server may allow users to opt in to or opt out of having their actions logged by the transportation matching system 102 or shared with other systems, such as, for example, by setting appropriate privacy settings. Third-party-content-object stores may be used to store content objects received from third parties. Location stores may be used for storing location information received from client devices 1606 associated with users.

In addition, the vehicle subsystem 1608 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1608 can include an autonomous vehicle—i.e., a vehicle that does not require a human operator. In these embodiments, the vehicle subsystem 1608 can perform maneuvers, communicate, and otherwise function without the aid of a human provider, in accordance with available technology.

In particular embodiments, the vehicle subsystem 1608 may include one or more sensors incorporated therein or associated thereto. For example, sensor(s) can be mounted on the top of the vehicle subsystem 1608 or else can be located within the interior of the vehicle subsystem 1608. In certain embodiments, the sensor(s) can be located in multiple areas at once—i.e., split up throughout the vehicle subsystem 1608 so that different components of the sensor(s) can be placed in different locations in accordance with optimal operation of the sensor(s). In these embodiments, the sensor(s) can include motion-related components such as an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1608 may include a communication device capable of communicating with the client device 1606 and/or the vehicle-motion-analysis system 104. For example, the vehicle subsystem 1608 can include an on-board computing device communicatively linked to the network 1604 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
    at least one processor; and
    a non-transitory computer readable medium comprising instructions that, when executed by the at least one processor, cause the system to:
        determine, for a provider device:
            a first location dataset by extracting global position system (GPS) sensor readings using a GPS sensor of the provider device; and
            a first motion dataset by measuring motion changes of the provider device using an inertial measurement unit of the provider device;
        determine that the first location dataset and the first motion dataset from the provider device are translatable to a transportation vehicle by detecting that the provider device is fixed in position and orientation relative to the transportation vehicle;
        determine, from the first location dataset and based on determining that the first location dataset and the first motion dataset are translatable to vehicle motion data, at least a portion of the vehicle motion data for the transportation vehicle by extrapolating linear vehicle acceleration data from the GPS sensor readings of the provider device indicating changes in location;
        generate axes-rotation parameters by vectorizing an axis rotation optimization function to generate, from the vehicle motion data, the first location dataset, and the first motion dataset, a provider device acceleration matrix and a provider device gyroscope matrix for aligning provider-device axes for the provider device with vehicle axes for the transportation vehicle;
        determine a vehicle-location dataset and a vehicle-motion dataset corresponding to a driving event of the transportation vehicle by applying the axes-rotation parameters to a second location dataset and a second motion dataset from the provider device;
        determine a driving-event score for the driving event based on the vehicle-location dataset and the vehicle-motion dataset; and
        provide a customized provider graphical user interface for display by the provider device based on the driving-event score.

2. The system of claim 1, further comprising instructions that, when executed by the at least one processor, cause the system to:
    determine a lateral-target acceleration, a linear-target acceleration, and a vertical-target acceleration for the transportation vehicle based on the first location dataset and the first motion dataset;
    identify a lateral-device acceleration, a linear-device acceleration, and a vertical-device acceleration for the provider device based on the first location dataset and the first motion dataset; and
    generate the axes-rotation parameters by comparing the lateral-target acceleration with the lateral-device acceleration, the linear-target acceleration with the linear-device acceleration, and the vertical-target acceleration with the vertical-device acceleration.

3. The system of claim 2, further comprising instructions that, when executed by the at least one processor, cause the system to:
    determine a target rotation of the transportation vehicle around a vertical axis based on gyroscope data and acceleration data from the first motion dataset;
    identify a device rotation of the provider device around the vertical axis based on gyroscope data from the first motion dataset; and
    generate the axes-rotation parameters by further comparing the target rotation of the transportation vehicle with the device rotation of the provider device.

4. The system of claim 1, further comprising instructions that, when executed by the at least one processor, cause the system to determine that the first location dataset and the first motion dataset from the provider device are translatable to the transportation vehicle by:
    detecting a closed circuit between the provider device and a device mount within the transportation vehicle by using a sensor that part of the device mount; and
    determining that the provider device is attached to the device mount affixed to the transportation vehicle based on detecting the closed circuit.

5. The system of claim 1, further comprising instructions that, when executed by the at least one processor, cause the system to generate the axes-rotation parameters by weighting the provider device gyroscope matrix with a relative gyroscope weight within a vectorized optimization function vectorized from the axis rotation optimization function.

6. The system of claim 1, further comprising instructions that, when executed by the at least one processor, cause the system to determine the driving-event score for the driving event by:
    identifying, based on the second location dataset, a set of location coordinates for the transportation vehicle between a start time of the driving event and an end time of the driving event;
    determining one or more stop locations for the transportation vehicle between the start time and the end time based on groupings of the set of location coordinates;
    determining one or more angle changes of the transportation vehicle based on changes in orientation of the provider device identified from the second motion dataset between the start time and the end time;
    determining one or more acceleration changes of the transportation vehicle identified from the second motion dataset between the start time and the end time; and
    generating the driving-event score based on the one or more stop locations, the one or more angle changes for the transportation vehicle, and the one or more acceleration changes of the transportation vehicle.

7. The system of claim 1, further comprising instructions that, when executed by the at least one processor, cause the system to:
    determine a location rating for a location associated with the driving event based on the driving-event score; or
    determine a provider rating for a provider associated with the provider device based on the driving-event score.

8. A non-transitory computer readable medium comprising instructions that, when executed by at least one processor, cause a computing device to:
    determine, for a provider device:

a first location dataset by extracting global position system (GPS) sensor readings using a GPS sensor of the provider device; and a first motion dataset by measuring motion changes of the provider device using an inertial measurement unit of the provider device;

determine that the first location dataset and the first motion dataset from the provider device are translatable to a transportation vehicle by detecting that the provider device is fixed in position and orientation relative to the transportation vehicle;

determine, from the first location dataset and based on determining that the first location dataset and the first motion dataset are translatable to vehicle motion data, at least a portion of the vehicle motion data for the transportation vehicle by extrapolating linear vehicle acceleration data from the GPS sensor readings of the provider device indicating changes in location;

generate axes-rotation parameters by vectorizing an axis rotation optimization function to generate, from the vehicle motion data, the first location dataset, and the first motion dataset, a provider device acceleration matrix and a provider device gyroscope matrix for aligning provider-device axes for the provider device with vehicle axes for the transportation vehicle;

determine a vehicle-location dataset and a vehicle-motion dataset corresponding to a driving event of the transportation vehicle by applying the axes-rotation parameters to at least a second dataset from the provider device;

determine a driving-event score for the driving event based on the vehicle-location dataset and the vehicle-motion dataset; and provide, for display by the provider device, a customized provider graphical user interface based on the driving-event score.

9. The non-transitory computer readable medium of claim 8, further comprising instructions that, when executed by the at least one processor, cause the computing device to:
determine a lateral-target acceleration, a linear-target acceleration, and a vertical-target acceleration for the transportation vehicle based at least on the first location dataset and the first motion dataset;
identify a lateral-device acceleration, a linear-device acceleration, and a vertical-device acceleration for the provider device based on the first location dataset and the first motion dataset; and
generate the axes-rotation parameters by comparing the lateral-target acceleration with the lateral-device acceleration, the linear-target acceleration with the linear-device acceleration, and the vertical-target acceleration with the vertical-device acceleration.

10. The non-transitory computer readable medium of claim 9, further comprising instructions that, when executed by the at least one processor, cause the computing device to:
determine a target rotation of the transportation vehicle around a vertical axis based on gyroscope data and acceleration data from the first motion dataset;
identify a device rotation of the provider device around the vertical axis based on gyroscope data from the first motion dataset; and
generate the axes-rotation parameters by further comparing the target rotation of the transportation vehicle with the device rotation of the provider device.

11. The non-transitory computer readable medium of claim 8, further comprising instructions that, when executed by the at least one processor, cause the computing device to determine that the first location dataset and the first motion dataset from the provider device are translatable to the transportation vehicle by:
detecting a signal strength between the provider device and a wireless transceiver within a device mount affixed to the transportation vehicle; and
determining that the provider device is attached to the device mount affixed to the transportation vehicle based on detecting the signal strength.

12. The non-transitory computer readable medium of claim 8, further comprising instructions that, when executed by the at least one processor, cause the computing device to determine the driving-event score for the driving event by:
identifying, based on at least the second dataset, a set of location coordinates for the transportation vehicle between a start time of the driving event and an end time of the driving event, wherein the second dataset comprises a second location dataset and a second motion dataset;
determining one or more stop locations for the transportation vehicle between the start time and the end time based on groupings of the set of location coordinates;
determining one or more angle changes of the transportation vehicle based on changes in orientation of the provider device identified from the second motion dataset between the start time and the end time;
determining one or more acceleration changes of the transportation vehicle identified from the second motion dataset between the start time and the end time; and
generating the driving-event score based on the one or more stop locations, the one or more angle changes for the transportation vehicle, and the one or more acceleration changes of the transportation vehicle.

13. The non-transitory computer readable medium of claim 8, further comprising instructions that, when executed by the at least one processor, cause the computing device to:
determine that the first location dataset and the first motion dataset of the provider device are translatable to the vehicle motion data by determining that the provider device does not rotate beyond a threshold angle relative to the transportation vehicle for at least a threshold period of time; and
generate the axes-rotation parameters based on determining that the first location dataset and the first motion dataset are translatable to the vehicle motion data.

14. The non-transitory computer readable medium of claim 8, further comprising instructions that, when executed by the at least one processor, cause the computing device to provide the customized provider graphical user interface by:
based on determining a location rating, provide a location-restriction element for display at a position within the customized provider graphical user interface corresponding to the location associated with the driving event; or
based on determining a provider rating, provide the provider rating for display within the customized provider graphical user interface.

15. A method comprising:
determining, for a provider device:
a first location dataset by extracting global position system (GPS) sensor readings using a GPS sensor of the provider device; and
a first motion dataset by measuring motion changes of the provider device using an inertial measurement unit of the provider device;

determining that the first location dataset and the first motion dataset from the provider device are translatable to a transportation vehicle by detecting that the provider device is fixed in position and orientation relative to the transportation vehicle;

determining, from the first location dataset and based on determining that the first location dataset and the first motion dataset are translatable to vehicle motion data, at least a portion of the vehicle motion data for the transportation vehicle by extrapolating linear vehicle acceleration data from the GPS sensor readings of the provider device indicating changes in location;

generating axes-rotation parameters by vectorizing an axis rotation optimization function to generate, from the vehicle motion data, the first location dataset, and the first motion dataset, a provider device acceleration matrix and a provider device gyroscope matrix for aligning provider-device axes for the provider device with vehicle axes for the transportation vehicle;

determining a vehicle-location dataset and a vehicle-motion dataset corresponding to a driving event of the transportation vehicle by applying the axes-rotation parameters to a second location dataset and a second motion dataset from the provider device;

determining a driving-event score for the driving event based on the vehicle-location dataset and the vehicle-motion dataset; and providing, for display by the provider device, a customized provider graphical user interface based on the driving-event score.

16. The method of claim 15, further comprising:

determining a lateral-target acceleration, a linear-target acceleration, and a vertical-target acceleration for the transportation vehicle based on the first location dataset and the first motion dataset;

identifying a lateral-device acceleration, a linear-device acceleration, and a vertical-device acceleration for the provider device based on the first location dataset and the first motion dataset; and generating the axes-rotation parameters by comparing the lateral-target acceleration with the lateral-device acceleration, the linear-target acceleration with the linear-device acceleration, and the vertical-target acceleration with the vertical-device acceleration.

17. The method of claim 16, further comprising:

determining a target rotation of the transportation vehicle around a vertical axis based on gyroscope data and acceleration data from the first motion dataset;

identifying a device rotation of the provider device around the vertical axis based on gyroscope data from the first motion dataset; and generating the axes-rotation parameters by further comparing the target rotation of the transportation vehicle with the device rotation of the provider device.

18. The method of claim 15, wherein determining that the first location dataset and the first motion dataset from the provider device are translatable to the transportation vehicle comprises:

classifying device motion data utilizing a machine learning model trained to predict hand-held motion events using training data from one or more of a Cambridge Mobile Telematics dataset or a Fleetcam-derived dataset; and determining that the first location dataset and the first motion dataset from the provider device are translatable to the transportation vehicle based on classifying the device motion data.

19. The method of claim 15, further comprising determining the driving-event score for the driving event by:

identifying, based on the second location dataset, a set of location coordinates for the transportation vehicle between a start time of the driving event and an end time of the driving event;

determining one or more stop locations for the transportation vehicle between the start time and the end time based on groupings of the set of location coordinates;

determining one or more angle changes of the transportation vehicle based on changes in orientation of the provider device identified from the second motion dataset between the start time and the end time;

determining one or more acceleration changes of the transportation vehicle identified from the second motion dataset between the start time and the end time; and generating the driving-event score based on the one or more stop locations, the one or more angle changes for the transportation vehicle, and the one or more acceleration changes of the transportation vehicle.

20. The method of claim 19, further comprising:

determine a location rating for a location associated with the driving event based on the driving-event score; or determine a provider rating for a provider associated with the provider device based on the driving-event score.

* * * * *